(12) United States Patent
Mihelcic

(10) Patent No.: US 7,196,730 B2
(45) Date of Patent: Mar. 27, 2007

(54) METHOD AND SYSTEM FOR COMPLETE 3D OBJECT AND AREA DIGITIZING

(75) Inventor: Joe Mihelcic, 12 Twisted Oak Street, Ontario, Brampton (CA) L6R 1T1

(73) Assignee: Joe Mihelcic, Brampton (CA)

( * ) Notice: Subject to any disclaimer, the term of this patent is extended or adjusted under 35 U.S.C. 154(b) by 708 days.

(21) Appl. No.: 10/005,166

(22) Filed: Dec. 7, 2001

(65) Prior Publication Data

US 2002/0071038 A1    Jun. 13, 2002

(30) Foreign Application Priority Data

Dec. 7, 2000   (CA) .................................... 2327894

(51) Int. Cl.
*H04N 5/225* (2006.01)
(52) U.S. Cl. .................. 348/373; 348/135; 348/207.99
(58) Field of Classification Search ..................... None
See application file for complete search history.

(56) References Cited

U.S. PATENT DOCUMENTS

| | | | |
|---|---|---|---|
| 4,131,914 A * | 12/1978 | Bricmont ..................... 348/83 |
| 4,294,544 A | 10/1981 | Altschuler et al. |
| 4,316,670 A | 2/1982 | Corwin et al. |
| 4,498,770 A | 2/1985 | Corwin et al. |
| 4,777,501 A | 10/1988 | Caimi et al. |
| 4,948,258 A | 8/1990 | Caimi |
| 4,979,815 A | 12/1990 | Tsikos |
| 5,193,120 A | 3/1993 | Gamache et al. |
| 5,216,476 A | 6/1993 | Lanckton |
| 5,424,835 A | 6/1995 | Cosnard et al. |
| 5,497,188 A | 3/1996 | Kaye |
| 5,513,276 A | 4/1996 | Theodoracatos |
| 5,675,407 A | 10/1997 | Geng |
| 5,753,931 A | 5/1998 | Borchers et al. |
| 5,778,548 A | 7/1998 | Cerruti |
| 5,848,188 A | 12/1998 | Shibata et al. |
| 5,870,220 A | 2/1999 | Migdal et al. |
| 5,889,582 A | 3/1999 | Wong et al. |
| 5,973,788 A | 10/1999 | Pettersen et al. |
| 6,081,273 A * | 6/2000 | Weng et al. ................. 345/420 |
| 6,094,269 A | 7/2000 | Ben-Dove et al. |
| 6,205,243 B1* | 3/2001 | Migdal et al. .............. 382/154 |
| 6,450,706 B1* | 9/2002 | Chapman .................... 396/428 |
| 6,600,553 B1* | 7/2003 | Stone ........................ 356/4.01 |
| 6,822,687 B1* | 11/2004 | Kakiuchi et al. ........... 348/348 |

* cited by examiner

*Primary Examiner*—Ngoc-Yen Vu
*Assistant Examiner*—Hung H. Lam
(74) *Attorney, Agent, or Firm*—Frank Martineau

(57) ABSTRACT

A method for generating a three-dimensional data model of a surface comprising the steps of selecting data parameters for the three-dimensional data model; configuring a data acquisition system corresponding to the data parameters, wherein the data acquisition system comprises a data acquisition apparatus and a data acquisition computer system; scanning the surface with the data acquisition system to obtain digital images of the surface and position data for determining three-dimensional coordinates of the surface; determining the three-dimensional coordinates of the surface from the position data and the digital images; associating the digital images with the three-dimensional coordinates to produce the three-dimensional data model; and, storing the three-dimensional data model in the data acquisition system.

15 Claims, 18 Drawing Sheets

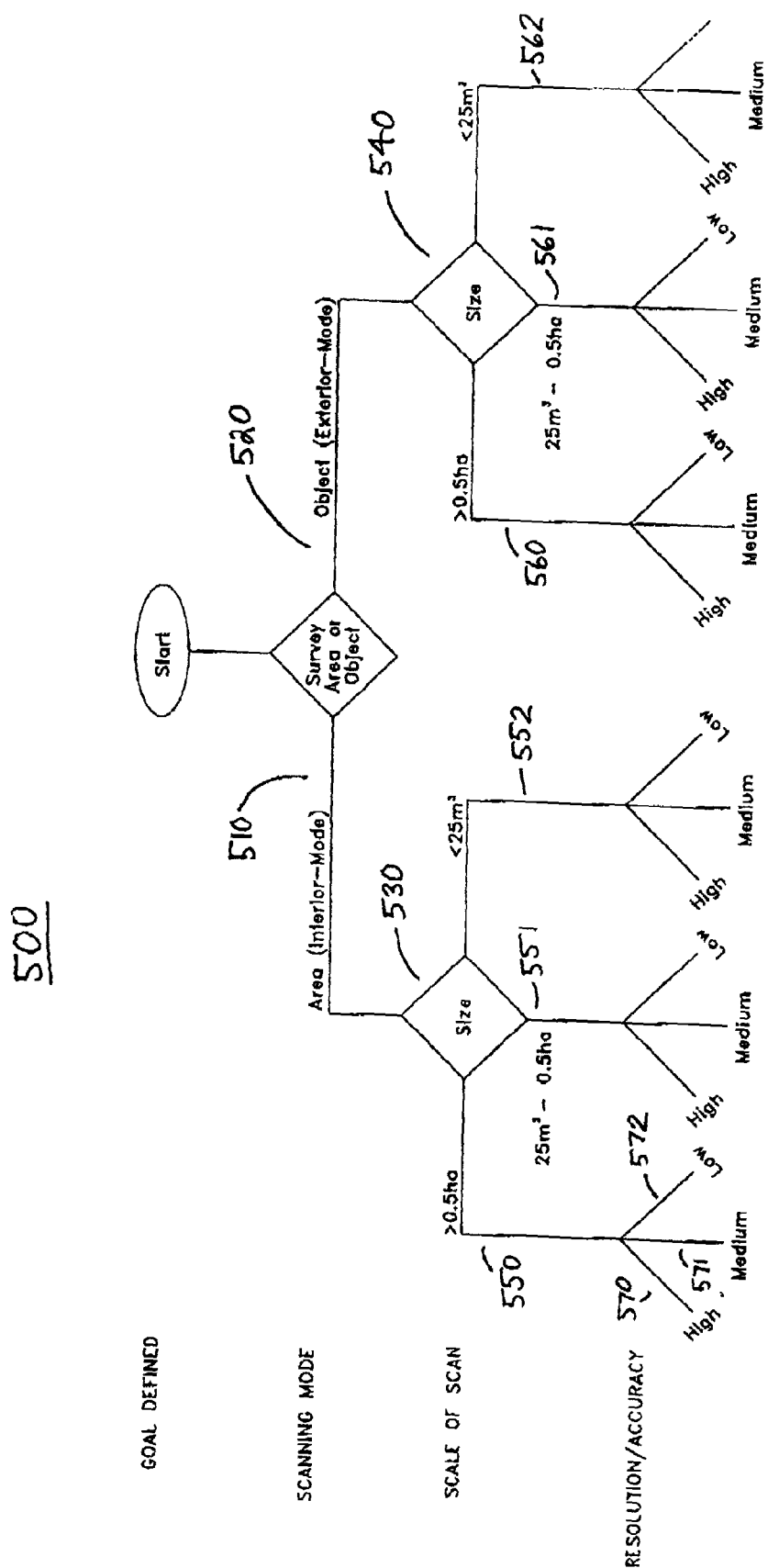

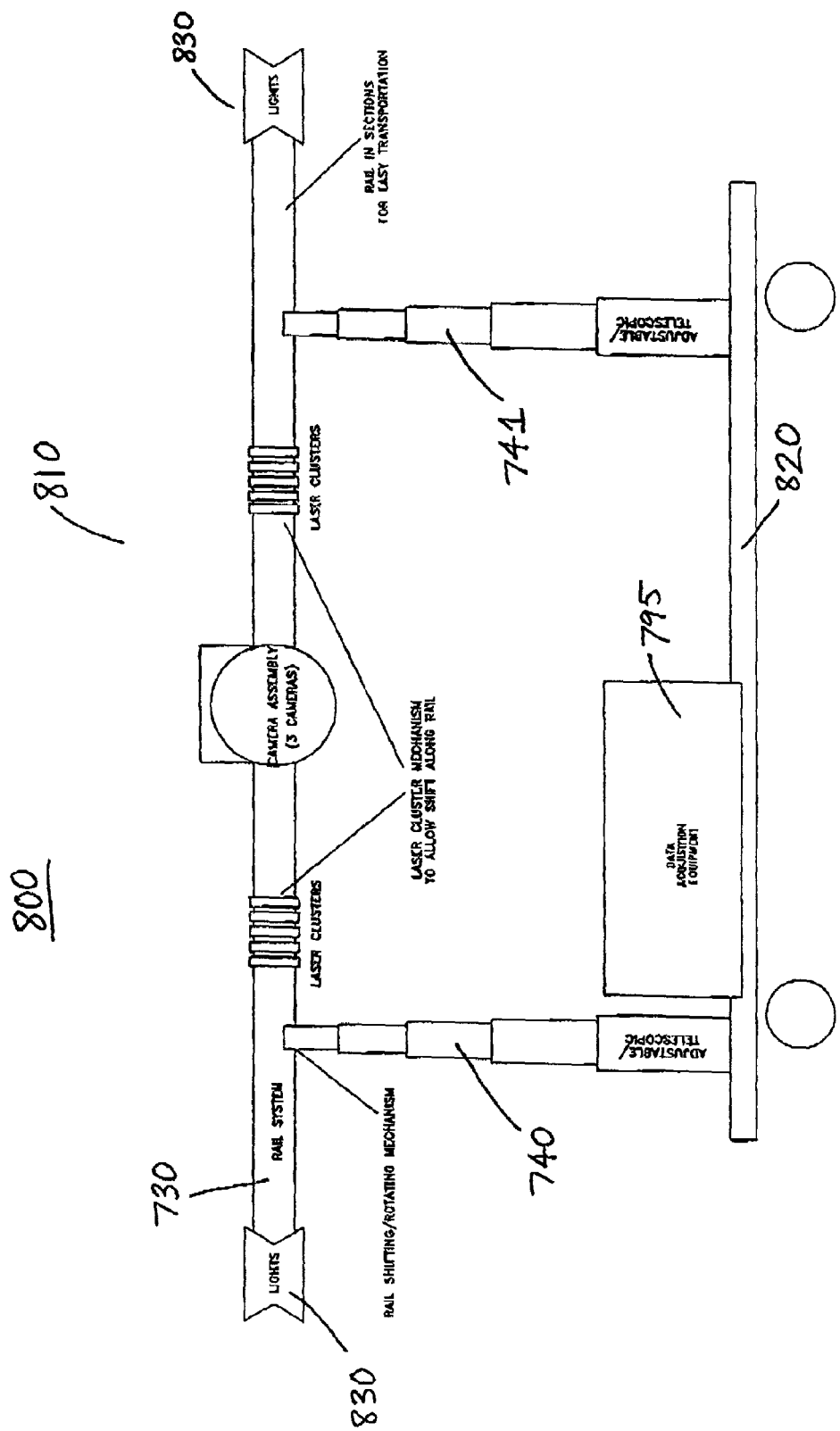

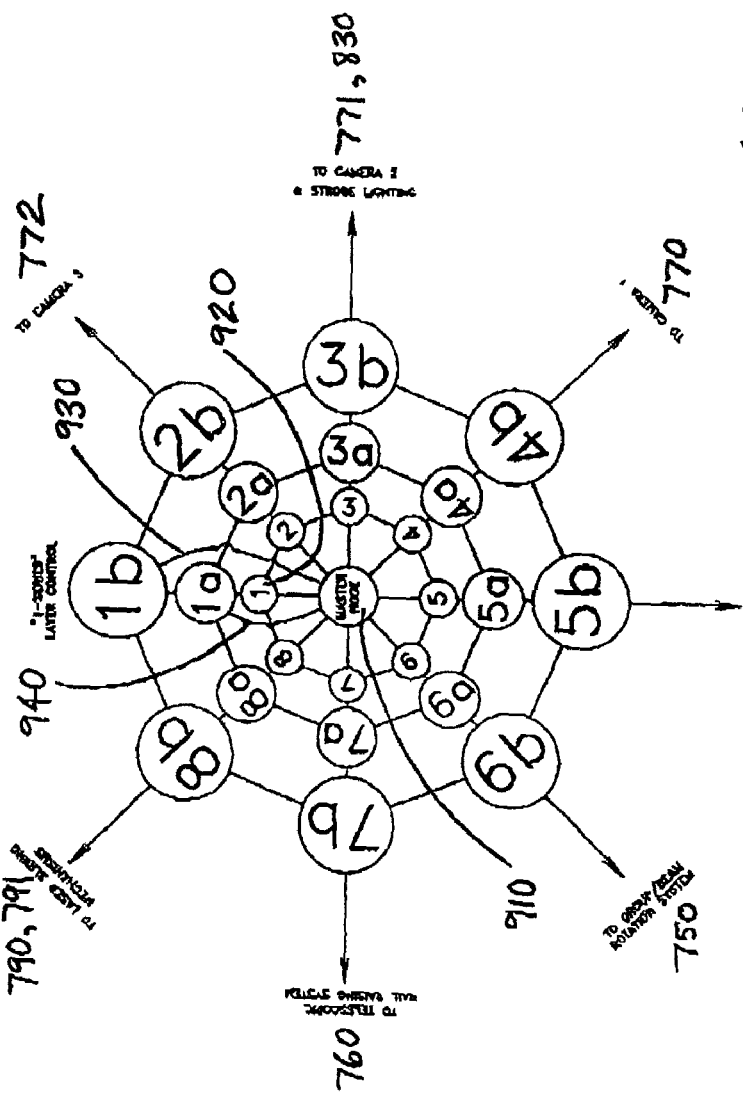
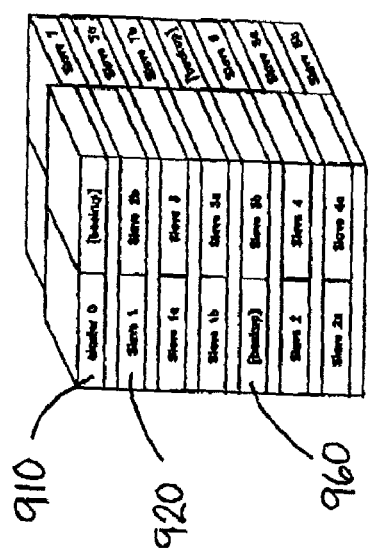
FIG. 9(a)
FIG. 9(b)

1610  1620  1630

| camera viewpoint angle (deg.) | distance centre-line to viewpoint | distance normalized, |
|---|---|---|
| 1.0000 | 0.0175 | 0.0315 |
| 2.0000 | 0.0349 | 0.0630 |
| 3.0000 | 0.0524 | 0.0945 |
| 4.0000 | 0.0699 | 0.1262 |
| 5.0000 | 0.0875 | 0.1578 |
| 6.0000 | 0.1051 | 0.1896 |
| 7.0000 | 0.1228 | 0.2215 |
| 8.0000 | 0.1405 | 0.2535 |
| 9.0000 | 0.1584 | 0.2857 |
| 10.0000 | 0.1763 | 0.3181 |
| 11.0000 | 0.1944 | 0.3507 |
| 12.0000 | 0.2126 | 0.3835 |
| 13.0000 | 0.2309 | 0.4165 |
| 14.0000 | 0.2493 | 0.4498 |
| 15.0000 | 0.2679 | 0.4834 |
| 16.0000 | 0.2867 | 0.5173 |
| 17.0000 | 0.3057 | 0.5516 |
| 18.0000 | 0.3249 | 0.5862 |
| 19.0000 | 0.3443 | 0.6212 |
| 20.0000 | 0.3640 | 0.6566 |
| 21.0000 | 0.3839 | 0.6925 |
| 22.0000 | 0.4040 | 0.7289 |
| 23.0000 | 0.4245 | 0.7658 |
| 24.0000 | 0.4452 | 0.8032 |
| 25.0000 | 0.4663 | 0.8412 |
| 26.0000 | 0.4877 | 0.8799 |
| 27.0000 | 0.5095 | 0.9192 |
| 28.0000 | 0.5317 | 0.9592 |
| 29.0000 | 0.5543 | 1.0000 |

$\psi$

| L metres | distance b metres | ratio a/(a+b) units | # pixels from CL |
|---|---|---|---|
| 0.0000 | 0.0000 | 1.0000 | 5000 |
| 0.5000 | 0.2772 | 0.9475 | 4737 |
| 1.0000 | 0.5543 | 0.9002 | 4501 |
| 1.5000 | 0.8315 | 0.8574 | 4287 |
| 2.0000 | 1.1086 | 0.8185 | 4093 |
| 2.5000 | 1.3858 | 0.7830 | 3915 |
| 3.0000 | 1.6629 | 0.7504 | 3752 |
| 3.5000 | 1.9401 | 0.7205 | 3602 |
| 4.0000 | 2.2172 | 0.6928 | 3464 |
| 4.5000 | 2.4944 | 0.6672 | 3336 |
| 5.0000 | 2.7715 | 0.6434 | 3217 |
| 5.5000 | 3.0487 | 0.6212 | 3106 |
| 6.0000 | 3.3259 | 0.6005 | 3003 |
| 6.5000 | 3.6030 | 0.5812 | 2906 |
| 7.0000 | 3.8802 | 0.5631 | 2815 |
| 7.5000 | 4.1573 | 0.5460 | 2730 |
| 8.0000 | 4.4345 | 0.5300 | 2650 |
| 8.5000 | 4.7116 | 0.5148 | 2574 |
| 9.0000 | 4.9888 | 0.5006 | 2503 |
| 9.5000 | 5.2659 | 0.4870 | 2435 |
| 10.0000 | 5.5431 | 0.4742 | 2371 |
| 10.5000 | 5.8202 | 0.4621 | 2310 |
| 11.0000 | 6.0974 | 0.4506 | 2253 |
| 11.5000 | 6.3746 | 0.4396 | 2198 |
| 12.0000 | 6.6517 | 0.4291 | 2146 |
| 12.5000 | 6.9289 | 0.4192 | 2096 |
| 13.0000 | 7.2060 | 0.4096 | 2048 |
| 13.5000 | 7.4832 | 0.4005 | 2003 |
| 14.0000 | 7.7603 | 0.3918 | 1959 |
| 14.5000 | 8.0375 | 0.3835 | 1918 |
| 15.0000 | 8.3146 | 0.3755 | 1878 |
| 15.5000 | 8.5918 | 0.3679 | 1839 |
| 16.0000 | 8.8689 | 0.3605 | 1803 |
| 16.5000 | 9.1461 | 0.3535 | 1767 |
| 17.0000 | 9.4233 | 0.3467 | 1733 |
| 17.5000 | 9.7004 | 0.3401 | 1701 |
| 18.0000 | 9.9776 | 0.3338 | 1669 |
| 18.5000 | 10.2547 | 0.3278 | 1639 |
| 19.0000 | 10.5319 | 0.3219 | 1610 |
| 19.5000 | 10.8090 | 0.3163 | 1581 |
| 20.0000 | 11.0862 | 0.3108 | 1554 |
| 20.5000 | 11.3633 | 0.3056 | 1528 |
| 21.0000 | 11.6405 | 0.3005 | 1502 |
| 21.5000 | 11.9176 | 0.2955 | 1478 |
| 22.0000 | 12.1948 | 0.2908 | 1454 |
| 22.5000 | 12.4720 | 0.2862 | 1431 |
| 23.0000 | 12.7491 | 0.2817 | 1409 |
| 23.5000 | 13.0263 | 0.2774 | 1387 |
| 24.0000 | 13.3034 | 0.2732 | 1366 |
| 24.5000 | 13.5806 | 0.2691 | 1346 |
| 25.0000 | 13.8577 | 0.2651 | 1326 |
| 25.5000 | 14.1349 | 0.2613 | 1307 |
| 26.0000 | 14.4120 | 0.2576 | 1288 |
| 26.5000 | 14.6892 | 0.2539 | 1270 |
| 27.0000 | 14.9663 | 0.2504 | 1252 |
| 27.5000 | 15.2435 | 0.2470 | 1235 |
| 28.0000 | 15.5207 | 0.2437 | 1218 |
| 28.5000 | 15.7978 | 0.2404 | 1202 |
| 29.0000 | 16.0750 | 0.2372 | 1186 |
| 29.5000 | 16.3521 | 0.2342 | 1171 |
| 30.0000 | 16.6293 | 0.2312 | 1156 |

1700

1750 — Laser Movement on Image
1760
1770
— Series
— Power Series

METHOD AND SYSTEM FOR COMPLETE 3D OBJECT AND AREA DIGITIZING

BACKGROUND OF THE INVENTION

Several systems for generating computer models of objects, scenes, or terrain are known including those disclosed in U.S. Pat. No. 6,094,269 (Den-Dove, et al.); U.S. Pat. No. 5,513,276 (Theodoracatos); and, U.S. Pat. No. 5,497,188 (Kaye). These systems scan the surface of an object with a laser and distal camera combination to produce a wire-frame, or raster model for later testing or simulation purposes. Other systems may use a laser and video camera to gather 3D images for virtual reality applications. Thus, 3D measurements may be taken and digital images captured with the objective of producing a non-life-like 3D model or a life-like 3D model constructed with "real" digital images. In the non-life-like 3D case, the digital camera is used primarily to establish 3D coordinates in conjunction with a laser. In the life-like "real" image 3D model, the digital camera is used to both establish 3D coordinates and to record actual images which will be incorporated in the resultant model.

One shortcoming of the current systems is their inability to produce models of objects, scenes, and terrain that vary widely in size. Most known systems focus on either small-scale object modelling or very large-scale terrain mapping or scene modelling. These known systems are not flexible enough for applications demanding wide variations in the size of the subject matter for which a model is desired. This is especially so for systems that attempt to produce "real" image 3D models.

A need therefore exists for a method, system, and apparatus that will allow for the effective "real" image 3D modeling of subject matter that can vary widely in size. Consequently, it is an object of the present invention to obviate or mitigate at least some of the above mentioned disadvantages.

SUMMARY OF THE INVENTION

The invention provides a system and apparatus for scanning areas and objects of varying size.

In accordance with this invention there is provided a method for acquiring visual information of an object, the method comprises a survey grid at a selected location, acquiring data points using a predetermined survey plan of the site, calculating 3D coordinates at the acquired data points, and subsequently post-processing this data for use by a variety of software applications. Accordingly, "real" 3D images of a target object or area can be collected and stored so that a user may subsequently regenerate and view images of the target object or area from any viewpoint via a computer and display.

According to another aspect of the invention, there is provided an apparatus for generating a three-dimensional data model of a surface comprising a data acquisition apparatus for scanning a surface to record digital images thereof and means for determining three-dimensional coordinates thereof.

The data acquisition apparatus comprises: at least one camera for recording digital images of the surface, the camera having an optical axis; at least two lasers for marking points in the digital images for determining the three dimensional coordinates of the surface, the lasers having optical axes, the optical axes of camera and lasers being substantially parallel; a rail for mounting the camera and lasers, the camera being mounted between the lasers, and the rail having means for moving the camera and lasers along the rail; at least one post extending from the rack and attached to the rail by a means for rotating and horizontally shifting the rail, the post having means for shifting the rail; at least one moveable platform for mounting the posts and for positioning the camera and lasers proximate to the surface; and, data acquisition equipment for adjusting the platforms, he posts, the rail, the camera, and the lasers, for recording position data for the platforms, the posts, the rail, the camera, and the lasers, and, for recording the digital images.

According to another aspect of the invention, a data acquisition system is provided for generating a three-dimensional data model of a surface. This data processing system has stored therein data representing sequences of instructions which when executed cause the method described herein to be performed. The data processing system comprises: a data acquisition apparatus for scanning said surface to record digital images thereof and to record data for determining three-dimensional coordinates thereof; and, a data acquisition computer system in communication with the data acquisition apparatus. The data acquisition computer system comprises: means for adjusting the data acquisition apparatus in accordance with user instructions; means for receiving position data and digital images from the data acquisition apparatus; means for determining three-dimensional coordinates of the surface from the position data ad the digital images; means for associating the digital images with the three-dimensional coordinates to produce a three-dimensional data model; memory for storing position data, digital images, three-dimensional coordinates, and the three-dimensional data model; a display for presenting the three-dimensional data model to the user; and, an input device for accepting user instructions from the user for adjusting the data acquisition apparatus.

According to another aspect of the invention, a method is provided for generating a three-dimensional data model of a surface. The method comprises the steps of: selecting data parameters for the three-dimensional data model; configuring a data acquisition system corresponding to the data parameters, wherein the data acquisition system comprises a data acquisition apparatus and a data acquisition computer system; scanning The surface with the data acquisition system to obtain digital images of the surface and position data for determining three-dimensional coordinates of the surface; determining the three-dimensional coordinates of the surface from the position data and the digital images; associating the digital images with the three-dimensional coordinates to produce the three-dimensional data model; and, storing the three-dimensional data model in the data acquisition system.

BRIEF DESCRIPTION OF THE DRAWINGS

The invention may best be understood by referring to the following description and accompanying drawings which illustrate the invention. In the drawings:

FIG. 5 is a decision tree diagram for planning a survey in accordance with the preferred embodiment;

FIG. 8 is a front view illustrating a data acquisition apparatus for small and medium-scale surveys in accordance with the preferred embodiment;

FIG. 9(a) is a block diagram of a data acquisition computer system for implementing the method and controlling the data acquisition apparatus of the present invention in accordance with one embodiment;

FIG. 9(b) is a schematic diagram of data acquisition computers configured as a web network in accordance with one embodiment;

FIG. 15 is a diagram illustrating laser scanning ranges in accordance with the preferred embodiment;

FIG. 16 is a table listing camera viewpoint angle degrees, distance centre-line to viewpoint, and distance normalized for an example case in accordance with the preferred embodiment;

DETAILED DESCRIPTION OF THE PREFERRED EMBODIMENTS

Figure 1:
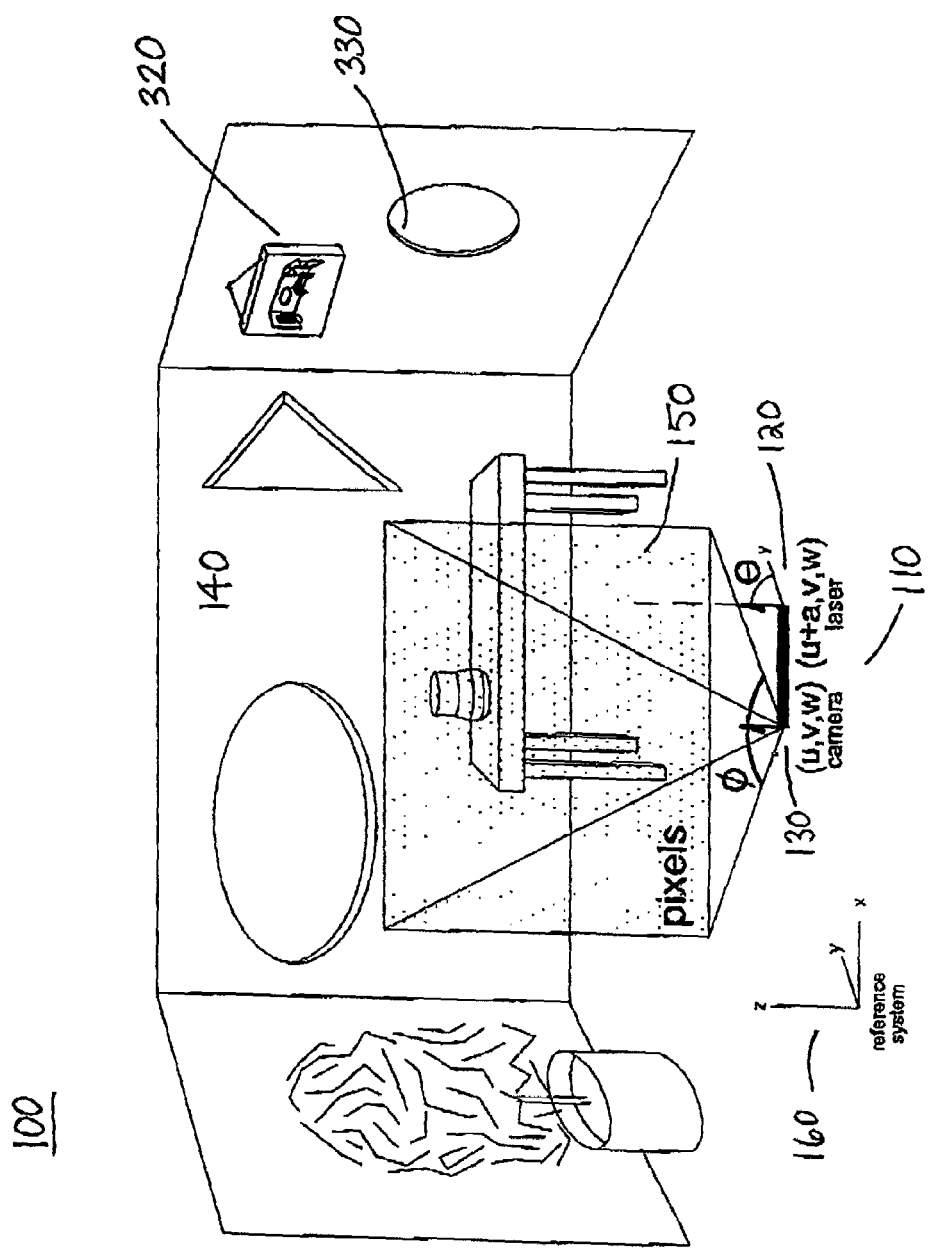
FIG. 1 is a simplified perspective view illustrating a single laser-camera scanning system in accordance with one embodiment.

In the following description, numerous specific details are set forth to provide a thorough understanding of the invention. However, it is understood that the invention may be practiced without these specific details. In other instances, well-known software, circuits, structures and techniques have not been described or shown in detail in order not to obscure the invention. The terms "data acquisition computer system" and "post-processing computer system" are used herein to refer to any machine for processing data, including the computer systems and network arrangements described herein. The term "real" image 3D model is used herein to refer to a computer generated model that incorporates actual images captured by a digital camera In the drawings, like numerals refer to like structures or processes.

The invention described herein provides a method, system, and apparatus for 3D scanning, acquiring and locating "real" visual information, storing this information with 3D coordinates, and processing this information for use in a wide variety of applications. The invention provides a system and apparatus for scanning areas and objects of any size.

The method of the present invention includes establishing a survey grid at a selected site, acquiring data using a predetermined survey plan and a data acquisition apparatus, calculating 3D coordinates, and subsequently post-processing this data so that it can be utilized by a variety of software applications. With the method, system, and apparatus of the present invention "real" 3D images from a target object or area can be collected and stored so that a user may subsequently regenerate and view images of the target object or area from any viewpoint scanned by the apparatus via a computer and display.

In general, it is not possible to determine the 3D coordinates of objects within a photograph without an external reference point. Typically, a laser beam offset from the position of the camera is used to provide such a reference point. Referring to FIG. 1, there is shown a simplified perspective view 100 illustrating a single laser/camera data acquisition apparatus 110 in accordance with one embodiment of the invention. The single laser/camera data acquisition apparatus 110 includes a laser 120 and a camera 130 which are directed toward a scene 140 a portion 150 of which is to be scanned and photographed to produce a "real" image 3D computer model. In FIG.1, the scene 140 is a room in a house. Both the laser 120 and camera 130 are directed parallel to each other along the y-axis of a reference coordinate system 160.

Figure 2:
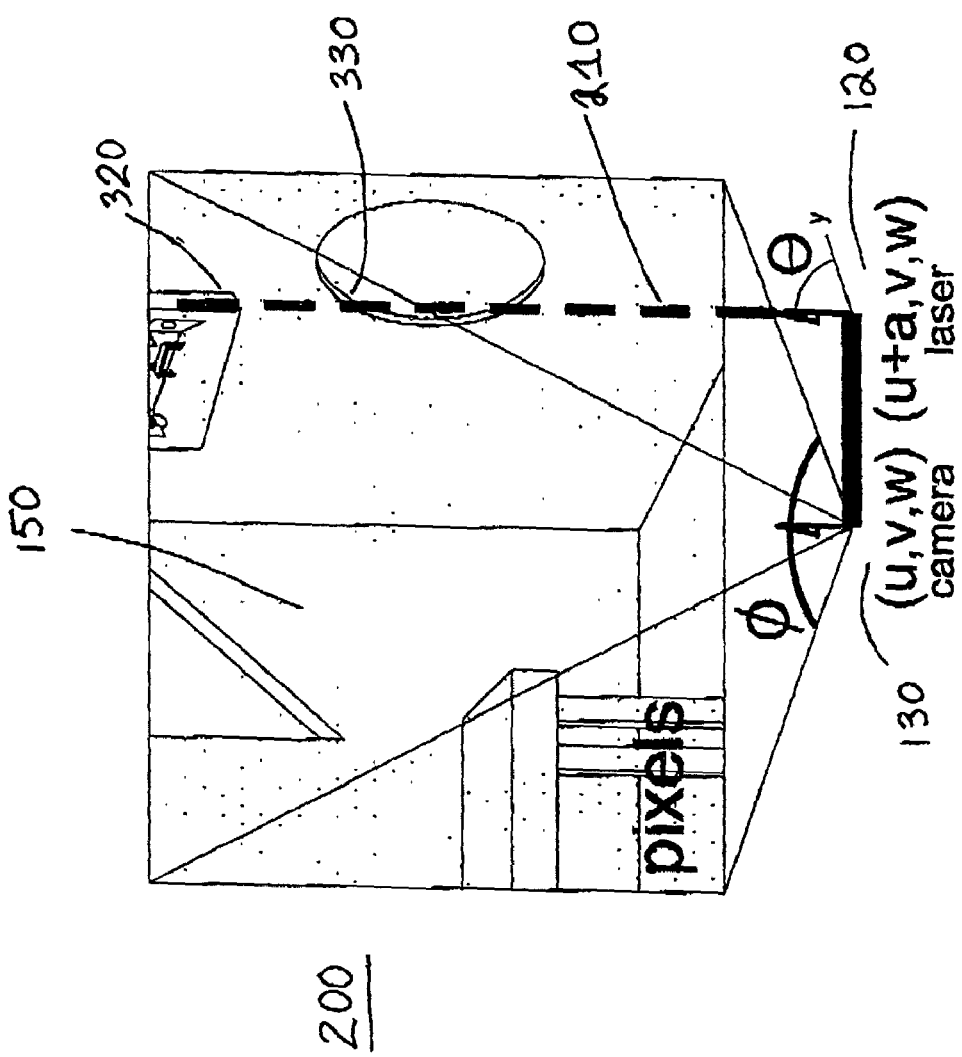
FIG. 2 is a perspective view illustrating the location of a single laser beam scan on a portion of a scene in accordance with one embodiment.
Figure 3:
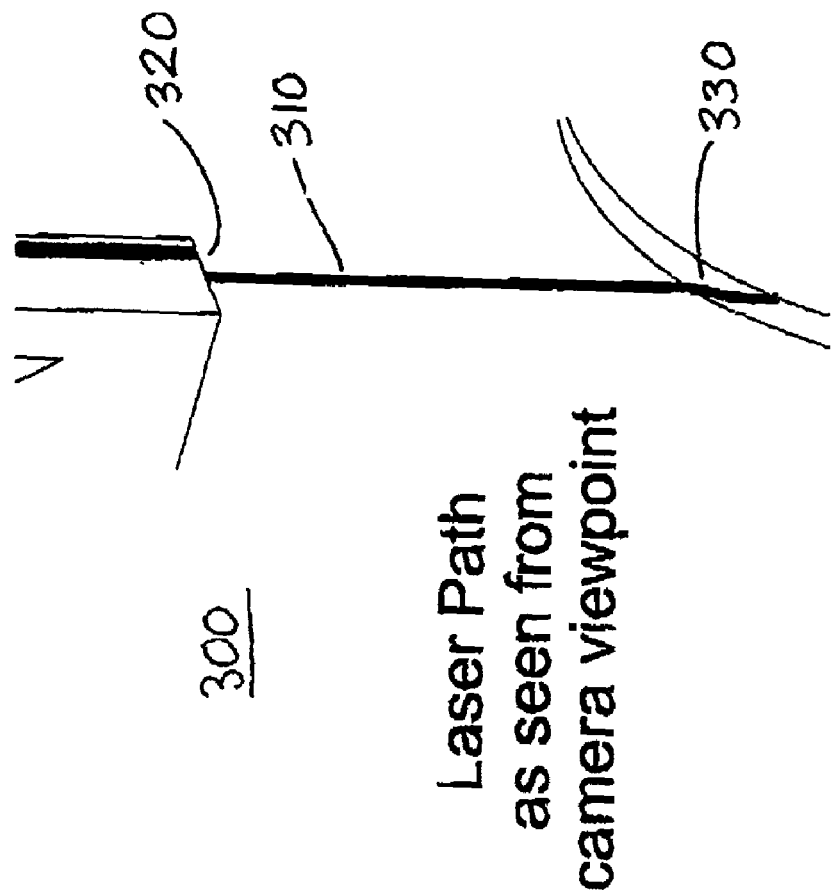
FIG. 3 is a detail perspective view illustrating the laser beam path from the viewpoint of the camera of the laser bean scan of FIG. 2 in accordance with one embodiment.

Referring to FIG. 2, there is shown a perspective view 200 illustrating the location of a single laser beam scan 210 on a portion 150 of a scene 140 in accordance with one embodiment of the invention. Referring to FIG. 3, there is shown a detail perspective view 300 illustrating the laser beam path 310 from the viewpoint of the camera 130 of the laser bean scan 210 of FIG. 2, in accordance with one embodiment of the invention. FIG. 3 is close-up view of the beam path 210 shown in FIG. 2. FIG. 3 illustrates the apparent shift in the laser point of impingement 320, 330 from the viewpoint of the camera 130. This apparent shift depends on the distance to the impinged object or scene 320, 330. By locating the position of the laser 120 on the scanned image or photograph 150, it is possible to determine the 3D coordinates of the impinged object 320, 330. This process is described in U.S. Pat. No. 5,753,931 (Borchers, et al.).

Figure 18:
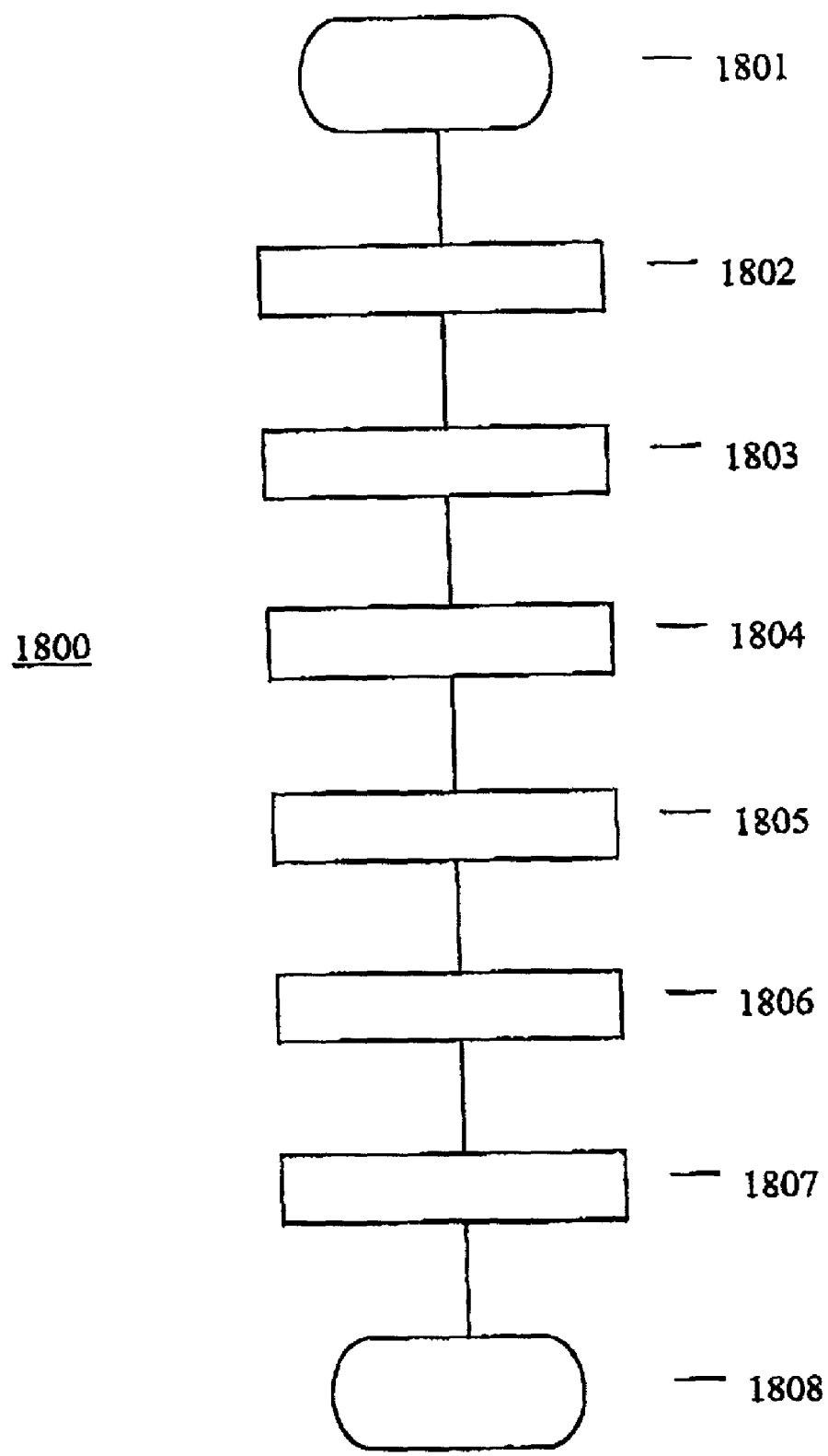

Method. Referring to FIG. 18, there is shown a flow chart 1800 illustrating a general method for collecting survey data including digital images and associated 3D coordinates for use in generating "real" image 3D computer models of subject matter of varying size in accordance with a preferred embodiment of the invention. At step 1801, the method starts. At step 1802, the goal of the survey is defined. At step 1803, a survey plan is produced. At step 1804, a data acquisition system is configured to conduct the survey. At step 1805, the survey is conducted using the data acquisition system and data is collected and stored. At step 1806, post-processing is conducted on the data by a post-processing computer system to prepare the data for use by external client applications. At step 1807, post-processed data is exported to and used by external client applications. At step 1808, the method ends.

Below, a detailed description of the method, system, and apparatus of the present invention is provided under the following headings:

Defining the Survey Goal
Producing a Survey Plan
Configuring the Data Acquisition System
Conducting the Survey
Post-Processing the Data
Applying the Data Defining the Survey Goal Prior to beginning a survey, the goal or purpose of the survey is established. Setting the right goal can reduce survey time and cost because the survey can be carried out with optimal settings. For example, if the goal of a large scale interior survey of a stadium is to allow a computer game to provide a realistic view of the stadium from the viewpoint of players on the field, then it may not be necessary to scan details of each and every seat, from positions above, behind and below each seat, in the entire stadium. On the other hand, if a crime scene is to be transferred to an investigator's computer for further analysis, then the amount of scanning detail required would need to be quite high, especially if the clue being sought is not known prior to scanning. In general, it may be better to acquire too much data rather than too little as the time and expense to revisit a site may be significant and restrictive. Moreover, the final scan product can be filtered to contain only the data required.

Producing a Survey Plan

After the goal has been determined, the survey can be planned. Referring to FIG. 5, there is shown a decision tree 500 for planning a survey in accordance with the preferred embodiment. The scope of the survey is determined by parameters including scanning resolution, detail, accuracy, time, budget, scale, and site access. These parameters may be interrelated. For example, low budgets may make it undesirable to attain a high scanning resolution. Site access restrictions may prevent detail from being achieved in restricted areas. If the goal of the survey is to obtain reconnaissance information, this will affect the specifications selected.

Mode

Figure 6B:
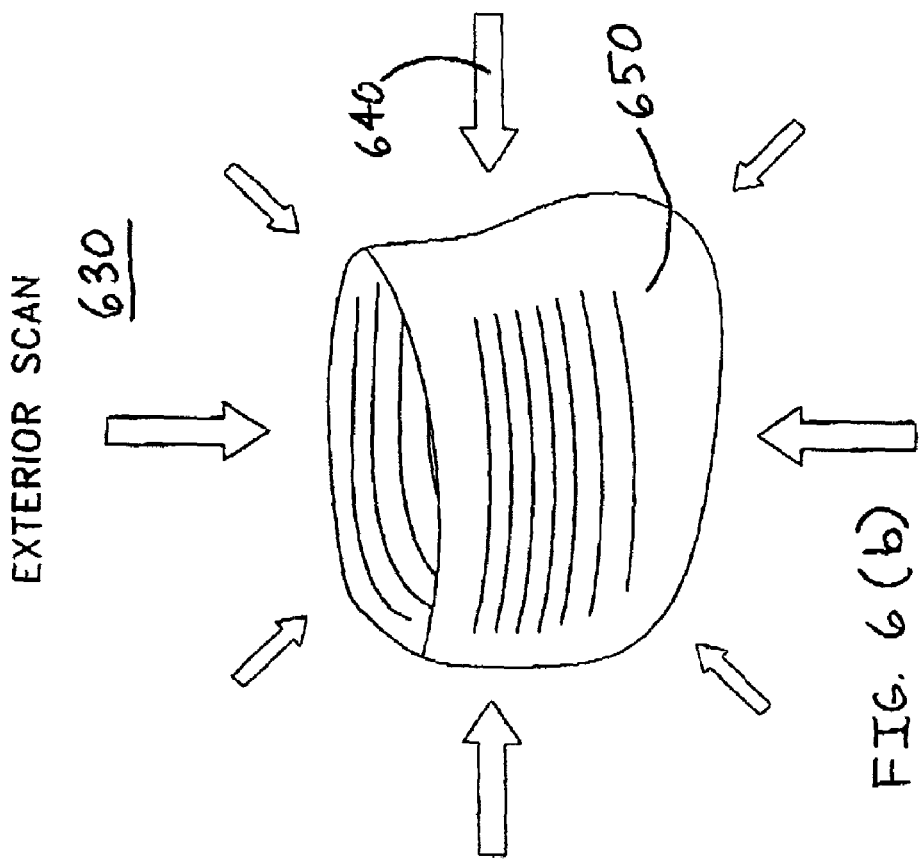
FIG. 6(b) is a schematic diagram illustrating the direction of an exterior scan in accordance with the preferred embodiment.
Figure 6A:
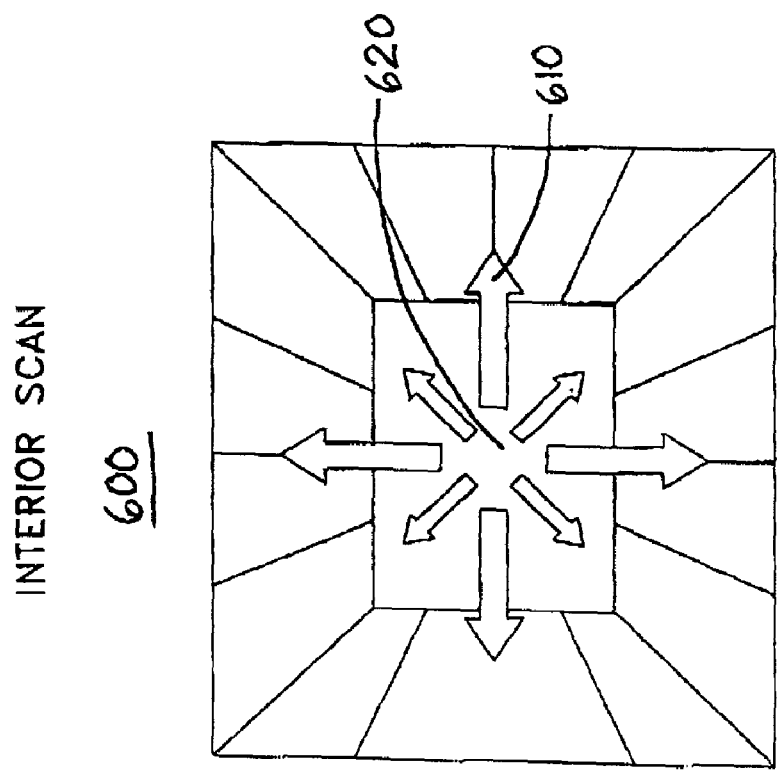
FIG. 6(a) is a schematic diagram illustrating the direction of an interior scan in accordance with the preferred embodiment.

The first step in developing a survey plan is to select the scanning mode. The scanning mode can include an interior mode 510 and an exterior mode 520. Exterior scans may be referred to as 'object' scans. Interior scans are outward looking and can include 'object' scans as a sub-set of an overall site scan. Exterior scans are inward looking. For example, scanning all of the surfaces in a room involves pointing the scanning apparatus away from the inside of the room. On the other hand, scanning an object involves directing the scan towards the centre of the object from outside the object. Referring to FIG. 6(*a*), there is shown a schematic diagram 600 illustrating the direction of an interior scan. The direction 610 of the scan is away from centre 620. Referring to FIG. 6(*b*), there is shown a schematic diagram 630 illustrating the direction of an exterior scan. The direction 640 of the scan is towards centre 650.

A survey can be conducted at night or in the dark by using various spectral technologies. For example, infrared light can be used to acquire images without white light.

Scale

A next step in planning the survey is to select the overall site or scale of the scan 530, 540. Overall scale can be divided into three subsets: large 550, 560, media 551, 561, and small 552, 562. Large-scale scans 550, 560 can be conducted for any area or object that can be "seen" by the system. That is, the laser beams (or spectral sources) must impinge on the surface being scanned and the camera (spectral or regular visual) must be capable of capturing the beams. Medium scale scans 551, 561 are for areas and objects that can be reached but some resolution may need to be sacrificed in select portions of the scene. Small-scale scans 552, 562 include areas and objects that have the highest degree of survey design flexibility given the various survey constraints. For example, a bullet found at a crime scene may need to be scanned at a super-high resolution to detect minute striations allowing its model to be "fired" using a computer, in super-slow-motion, thus allowing precise model studies.

Data Quality

The quality of measurements can depend on time and budget limitations. Typically, the optimal survey configuration that can achieve the goals set for the survey, in the shortest possible time and at the lowest cost, is the ideal configuration. Data quality can be selected from high 570, medium 571, and low 572 resolution, accuracy, and/or detail. Note that modern digital cameras are often compared in terms of "megapixels" rather than resolution. For example, a three-megapixel camera may be considered as better than a one-megapixel camera.

Compression and image stabilization methods may be used. Data compression may be used to "fine tune" the operation of the survey. Image stabilization methods that allow images to be acquired without degradation of picture quality may be used with caution as the positioning calculations, described below, must take into account any "shifts" in picture positioning caused by stabilizers.

Having planned the survey, the next step is to configure a system to implement the survey.

Configuring the Data Acquisition System

In order to conduct the planned survey, a data acquisition system must be configured and calibrated. It is preferable that the data acquisition system allows for adaptation to different survey scales and modes as defined by the survey plan. The data acquisition system includes a data acquisition computer system and at least one data acquisition apparatus. The data acquisition computer system controls the data acquisition apparatus and uses data acquisition equipment associated with the data acquisition apparatus to fulfil its instructions.

Data Acquisition Apparatus

According to one embodiment of The invention, the data acquisition system includes a data acquisition apparatus consisting of posts and rails for mounting cameras and lasers. This system can achieve high quality for small objects (e.g. baseball sized) and relatively high quality for large-scale surveys (e.g. a stadium interior). According to one embodiment of this data acquisition apparatus, components are mounted on a rail that can be raised using extendable posts. This data acquisition apparatus can be transported via trucks, carts, ground rails, or hand.

Figure 7:
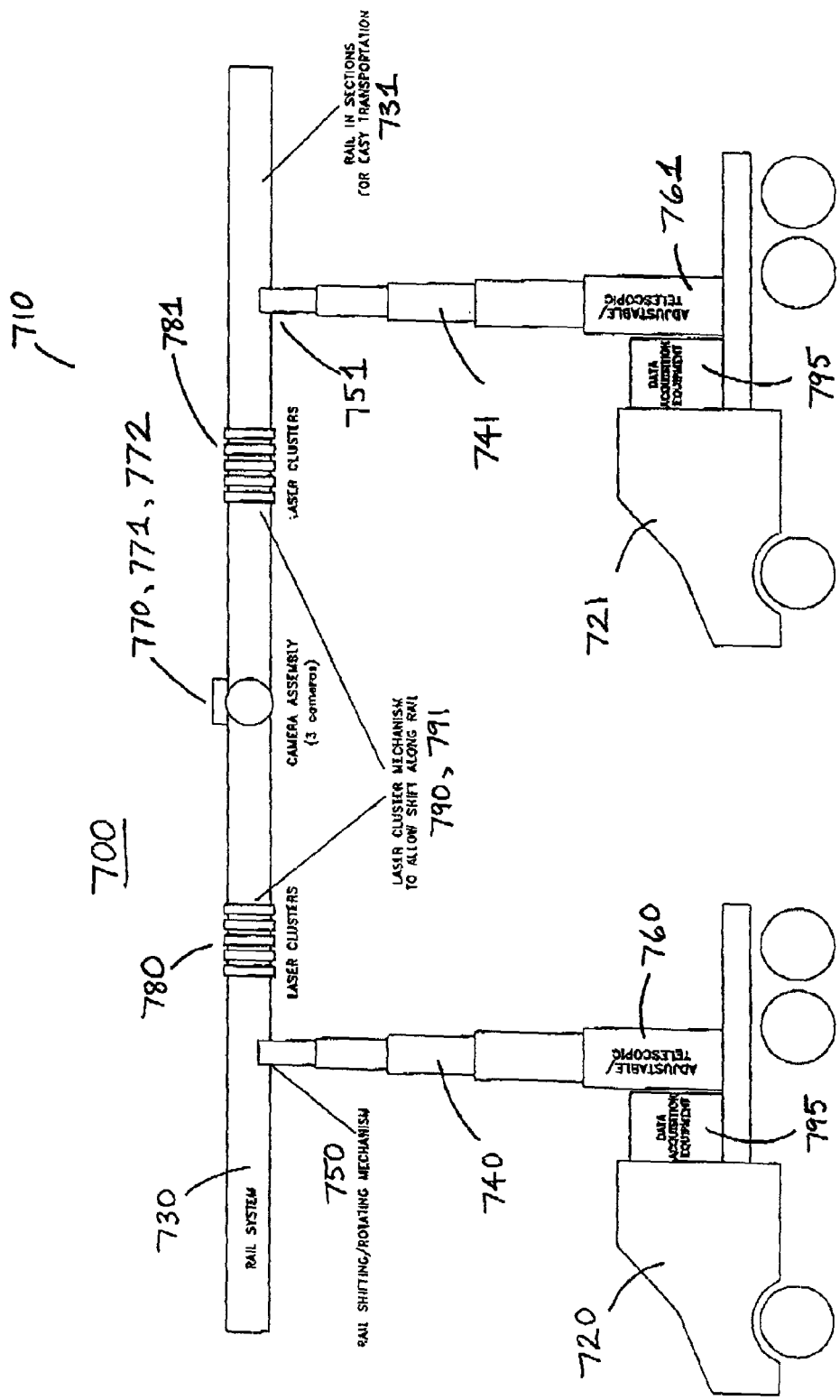
FIG. 7 is a front view illustrating a data acquisition apparatus for large-scale surveys in accordance with the preferred embodiment.

Referring to FIG. 7, there is shown a front view 700 illustrating a data acquisition apparatus for large-scale surveys 710 in accordance with a preferred embodiment of the invention. For large-scale surveys, the data acquisition apparatus 710 can be mounted on trucks 720, 721, or other vehicles, so that greater heights and stability can be achieved. Various leveling and measurement systems, including off-the-shelf GPS (Global Positioning System) and range-finding equipment, can be incorporated into the data acquisition apparatus 710 To assure accurate measurements. The rail 730 is coupled to each post 740, 741 by means for shifting and rotating 750, 751, for example, hydraulic or electric actuators. Each post 740, 741 includes means for telescopic adjustment 760, 161, for example, hydraulic or electric actuators. The data acquisition apparatus 710 can be dismantled for transportation. For example, the rail 730 may be composed of sections 731 to facilitate disassembly and transport.

At least three cameras 771, 772, 773 can be used with each camera pointing in one of the following directions: forward (into paper) 771, reverse (out of paper) 772, and up (above trucks) 773. Laser clusters 780, 781 can be configured so that the beams from at least one pair of clusters 780, 781, located on either side of the cameras 770, 771, 772, are captured by each one of the three cameras. The laser clusters 780, 781 are mounted on the rail 730 on either side of the cameras 770, 771, 772. Each laser cluster 780, 781 includes at least one laser. Each laser and laser cluster 780, 781 includes means for shifting 790, 791 along the rail 730, for example, hydraulic or electric actuators.

Each vehicle 720, 721 is equipped with data acquisition equipment 795. The data acquisition equipment 795 facilitates communication with a data acquisition computer system 900 which is described below. One of the vehicles 720, 721 can house the data acquisition computer system 900.

A laser/camera "group" is composed of at least one camera and two corresponding laser clusters. Typically, a laser/camera group consists of three cameras 770, 171, 772 and hence six corresponding laser clusters. In this case, each camera 770 and its two corresponding laser clusters 780, 781 may be referred to as a laser/camera "subgroup". The camera and lasers of each subgroup point in the same direction as described above. The means for shifting and rotating 750, 751 along the rail 730 is used to shift each laser/camera group along the rail 730.

Note that the means for shifting and rotating 750, 751 is used for supporting, shifting and rotating the entire camera/laser group. The means for shifting along the rail 790, 791 includes means for varying parameters for each camera/laser subgroup. That is, each laser/camera subgroup can have different settings depending on the survey site. For example, if the data acquisition apparatus is located near a first building wall in the positive y-direction 160 which is to be scanned by a fat laser/camera subgroup and in the negative y-direction a corresponding second building wall is located somewhat further away and which is to be scanned by a second laser/camera subgroup, then a greater "a-spacing", as described below, for the second laser/camera subgroup can be accommodated.

The data acquisition apparatus 710 including rail 730, posts 740, 741, cameras 711, 772, 773, laser clusters 780, 781, data acquisition equipment 795, means for shifting and rotating 750, 751 means for telescopic adjustment 760, and means for laser shifting 790, 791 are responsive, generally through the data acquisition equipment 795, to a data acquisition computer system 900 which will be described in more detail below. The data acquisition computer system 900 stores data including the positions of the trucks 720, 721 on an established grid, the location and rotational position of the laser/camera group, the spacing of individual lasers within each cluster (i.e. resolution related), and the "a-spacing" of the group (i.e. the distance between each camera and its corresponding lasers the significance of which will be described below). The data acquisition computer system 900 also controls the survey speed and the rate at which photographs are recorded.

Referring to FIG. 8, there is shown a front view 800 illustrating a data acquisition apparatus for small and medium-scale surveys 810 in accordance with a preferred embodiment of the invention. For small and medium-scale surveys, the data acquisition apparatus 810 can be mounted on a single cart 820 or platform. As with the large-scale apparatus 710, a data acquisition computer system 900 controls elements of the data acquisition apparatus 810 generally through the data acquisition equipment 795. A "strobe" lighting system 830 can also be used if better lighting conditions are required to distinguish the laser beams from the surface being scanned.

Both trucks 920, 921 and carts 820 can be added in series to allow greater scanning depths by permitting the laser clusters 780, 781 to be located further away from the cameras 771, 772, 773. In this way, the data acquisition system may include several data acquisition apparatus. The combination data acquisitions apparatus can then be transported along each survey grid line as will be discussed below.

Figure 4:
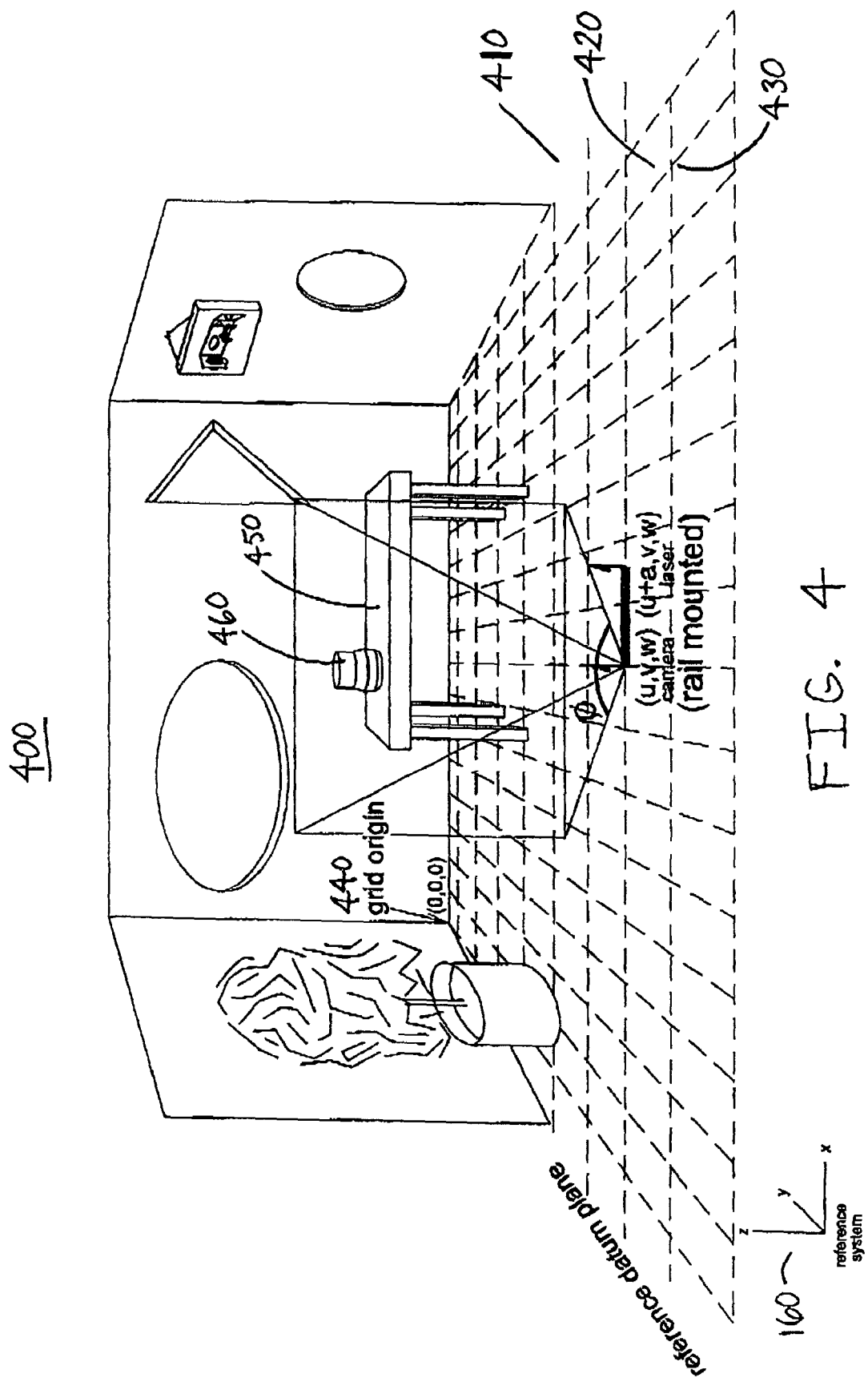
FIG. 4 is a perspective view of a survey grid in accordance with the preferred embodiment.

Referring to FIG. 4, there is shown a perspective view 400 of a survey grid 410 in accordance with the preferred embodiment of the invention. Each grid cell 420 represents the possible location of a data acquisition apparatus 820. The width of the grid cell 420 is the same, or smaller to allow for overlap, as the laser/camera group's range of motion along the rail 730. The group moves along the rail 730 to its limit, like a typewriter carriage. The group is then "carriage-returned" as the whole cart 820 is moved to the next grid cell 420. Higher resolution can be achieved with smaller camera movements and tighter laser clusters. The reverse can be done for lower resolution. The grid vertices 430 can be established at the survey site using physical markings (e.g. using spray paint outdoors, chalk indoors, etc.) or GPS (Global Positioning System) data.

An advantage of the vertical telescopic adjustment means 760, 761 is that it prevents the survey area 410 from becoming obscured. The rail 730, which includes means 750, 751 for laser/camera group rotation, is mounted on top of the posts 740, 741. Guide wires, or similar means, can be used to stabilize the data acquisition apparatus 710, 810, as required.

Data Acquisition Computer System

Referring to FIG. 9(a), there is shown a block diagram of a data acquisition computer system 900 for implementing the method and controlling the data acquisition apparatus of the present invention in accordance with one embodiment. The data acquisition computer system 900 includes a computer master node 910 controlling a cluster of parallel computer slave nodes 920. These computers 910, 920 may be mounted in a rack. They may be networked in a number of ways, including, but not limited to cubes, hyper-cubes (i.e. cubes within cubes), meshes, and layered webs. The data acquisition computer system 900 may also include an input device, memory, and a display. The input device may be a keyboard, mouse, trackball, or similar device. The memory may include RAM, ROM, databases, or disk devices. And, the display may include a computer screen or terminal device. The data acquisition computer system 900 has stored therein data representing sequences of instructions which when executed control the data acquisition apparatus and cause the method described herein to be performed. Of course, the data acquisition computer system 900 may contain additional software and hardware a description of which is not necessary for understanding the invention.

Referring to FIG. 9(b), There is shown a schematic diagram of data acquisition computers 910, 920 configured as a web network 950 in accordance with one embodiment of the invention. Each layer of the web network can interact with another computer node. The connection between computers can be altered depending upon the survey plan. For example, if required, one computer from each layer can be connected directly to the master node 910. That is, nodes 1a and 1b may be connected directly 930, 940 to the master node 910. The 1-series of nodes controls each layer (i.e. nodes 1, 1(a), and 1(b)). This provides better control of the individual layers from the master node. Additional layers can be added as required. In addition, the number of nodes per layer may be varied. In FIG. 9(b), there are 8 nodes per layer (e.g. nodes 1, 2, 3, 4, 5, 6, 7, and 8 are in the first layer while nodes 1a, 2a, 3a, 4a, 5a, 6a, 7a, and 8a are in the second layer). Moreover, some nodes (960 in FIG. 9(a)) can function as backups to take over in the event of the failure of adjacent nodes.

An advantage of having several nodes connected to each other is to allow for the "smart" processing of data. For example, if a node that processes a particular laser (e.g. node 5b) acquires data that can not be used by another layer that processes its data (e.g. too dark, too much interference, etc.), then the system should decide whether it is worth stopping the process or continuing. The only way a decision like this can be made "on-the-fly" is to allow the interchange of error-checking variables between the nodes at all times. If enough relevant errors accumulate, then the software can calculate a corrective course of action, in real time, without manual intervention. For example, data acquisition may continue if the loss of one laser is not deemed to adversely effect the resolution requirements of the survey plan and if time limitations dictate that it is more important for the survey to proceed than to terminate.

Another advantage of a parallel-processing environment is that extremely large amounts of data can be acquired and stored at extremely high rates. Each computer node carries out specific tasks in parallel with each other computer node. Consequently, the bottleneck in the scanning process will be the mechanical systems used. For example, the speed of the cameras (i.e. number of photographs per second) and the speed by which the laser/camera group can be moved or rotated along the rail, posts, and grid.

In the web network configuration of FIG. 9(b), the nodes in the outermost layer of the cluster (i.e. nodes 1b, 2b, 3b, 4b, 5b, 6b, 7b, and 8b) control the data acquisition apparatus 710, 810 (i.e. cameras 770, 771, 772, lighting 830, laser clusters 780, 781, group shifting and rotating means 750, 751, telescopic adjustment means 760, laser sliding means 790, 791, etc.) These nodes can be located at the data acquisition apparatus 710, 810 in the data acquisition equipment 795. This "b-series" of nodes instructs individual data acquisition apparatus subsystems to carry out specific tasks. The b-series also acts as the gateway for incoming data. This incoming data is passed from the b-series nodes to the "a-series" nodes of the next layer (i.e. nodes 1a, 2a, 3a, 4a, 5a, 6a, 7a, and 8a). The a-series cluster layer stores the data from the adjacent higher level b-series node layer with time stamps and grid coordinates of the different data acquisition apparatus subsystems (e.g. distance between laser clusters, distance between individual lasers in clusters, spectral values used for each cluster, group rotation/position, etc). The "single-digit" node layer (i.e. nodes 1, 2, 3, 4, 5, 6, 7, and 8) performs diagnostic services, synchronizes the clocks of all nodes, passes instructions regarding distances, angles, light intensity, etc., from the master node 910 to the higher node layers. The master node 910 provides user input to all systems (e.g. via keyboard and display) and passes instructions to the various nodes to control the overall data acquisition system.

The data acquisition computer system 900 can make use of a wide variety of parallel processing application development tools including "PADE" (parallel applications development environment) and "XPVM" as well as code profiling tools such as "Tau". A number of parallel processing libraries are becoming more common hence making parallel programming easier (e.g. "PAWS" (parallel application workspace) and "POOMA" (parallel object-oriented methods and applications)). With the wide spread use of the Internet and access to Linux programming expertise, these and other tools are being used more often.

3D Data Coordinates: Dots and Stripes

As described above, the data acquisition apparatus 710, 810 includes laser clusters 780, 781 and cameras 770, 771, 772 mounted On a rail 730. For data acquisition, the camera "pinhole" model can be used as described in U.S. Pat. No. 4,979,815 to Tsikos. The height of the laser/camera groups is controlled with the telescopic adjustment means 760, 761. The distance between the individual lasers and between the laser clusters and cameras on the rail is controlled by the laser shifting means 790, 791. In the present invention, the laser "dot" is always located along the centre horizon of the photograph or scene/object to be scanned. That is, the laser is projected parallel to the optical axis of the camera.

A laser "stripe", pointing parallel to the camera direction, can also be used, where discrete segments of the stripe are equivalent to a series of laser dots with varying angles above and below the horizon. The laser stripe would also have unique solutions for various laser/camera a-spacings. Using a laser stripe may eliminate the need to rotate the laser/camera group. However, the use of laser stripes requires a relatively large number of calibrations and calculations to account for effects such as lens distortion and offset viewpoints. Employing laser stripes may be worthwhile if the time required to rotate the group through its normal range of motion is greater than the time required to obtain accurate laser stripe data.

A description of a method for obtaining 3D coordinates of "real" images from lasers and cameras in accordance with the preferred embodiment will now be provided.

3D Data Coordinates: Determining the Location of The Camera Focal Point and the Field of Vision Angle In the present invention, images are acquired by a digital camera. The camera can operate in the human-visual or spectral (i.e. infra-red and other remote-sensing frequencies not visible to naked eye) ranges. The camera has to be "calibrated" so that the angles from the centre of the image to each pixel may be determined. Calibration tests can account for lens distortion and precision of the instrumentation.

Figure 10:
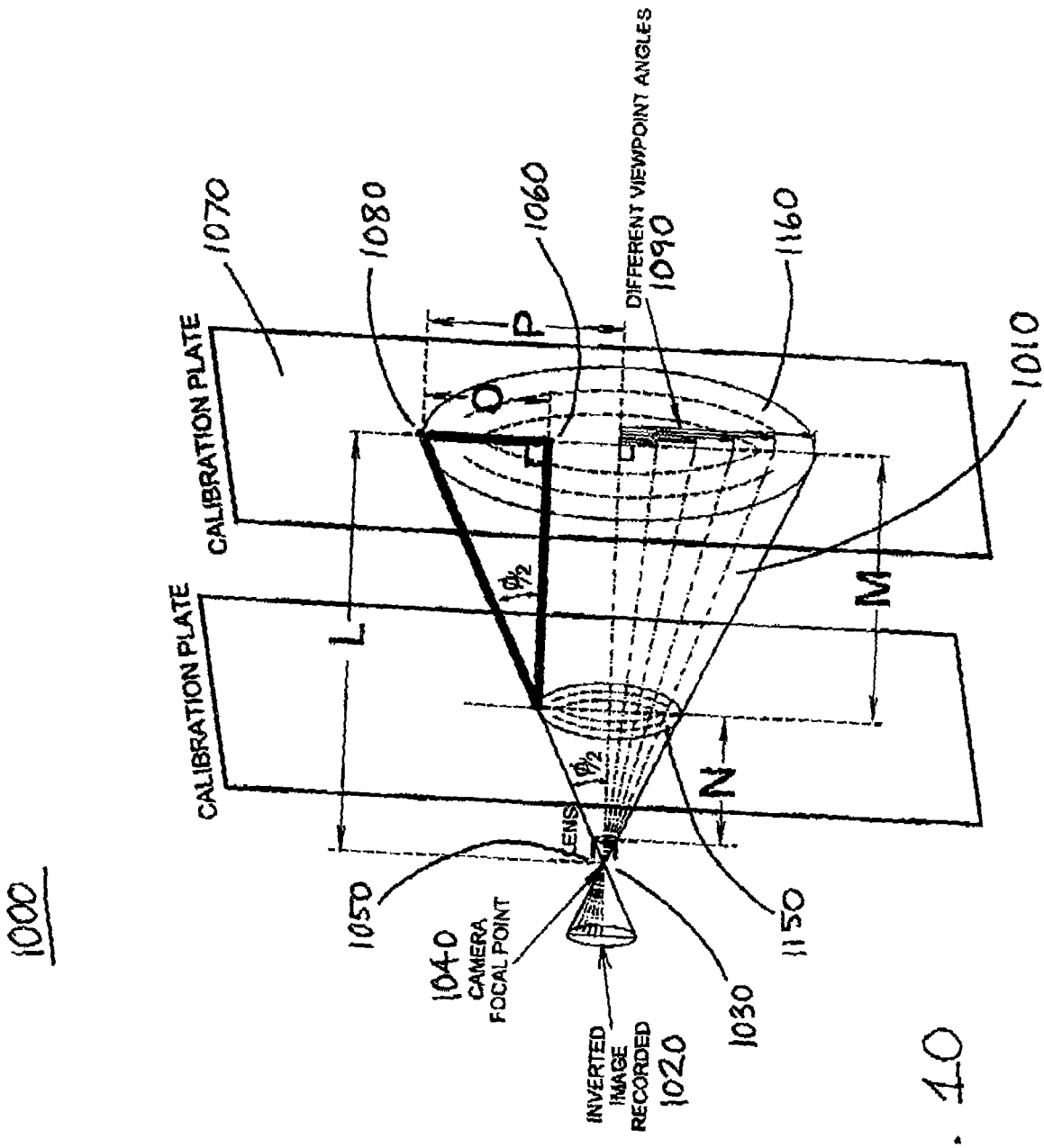
FIG. 10 is a perspective view of a camera's field of vision cone in accordance with the preferred embodiment.

The camera "sees" an image within its field of vision, which is comparable to the view one would have looking trough a hollow cone from the narrow end. Referring to FIG. 10, there is shown a perspective view 1000 of a camera's field of vision cone 1010 in accordance with the preferred embodiment. The total cone angle may be referred to as φ. Note that an image is actually inverted 1020 within the camera 1030 prior to being transferred to the negative film or recording surface. While the focal point 1040 may be located in the centre of the camera 1030, this is not always the case. Therefore, it is necessary to determine where the focal point 1040 of the camera 1030 is located for the specific lens 1050 being used.

To calculate the true focal point 1040, at least two calibration tests should be made: one at a distance M+N, where N is approximately equal to M, and another at a distance N. These distances may depend on the type of lens being used. A narrower angle lens would typically require larger distances (i.e. larger values of M and N) whereas a wide-angle lens may use require relatively small distances. Photographs obtained using each such lens would show two different vantage points for the same calibration plate. The shift of a certain point 1060 at the outer edge of the photograph may be represented the variable O. The value of O can be obtained by reading the shift off the calibration plate 1070. The angle $\phi/2$ can be determined with the following equation:

$$\tan(\phi/2) = O/M \quad \text{(equation 1)}$$

where O and M are both directly measurable from the calibration plate 1070.

It is important to use the outermost point 1080 useable on the rest photograph 1070, so that the true field of vision can be used. The value L can be determined with the following equation:

$$\tan(\phi/2) = P/L \quad \text{(equation 2)}$$

where P and $\phi/2$ are both known, P being measured directly from calibration plate 1070. From L the actual location of the focal point 1040 can then be determined.

Note that the values of O and P can be converted to pixels per meter. This may be done by counting the number of pixels on the photograph included in the distances covered by O and P. These pixels per meter values will be required for laser related calculations as will be discussed below.

Figure 11:
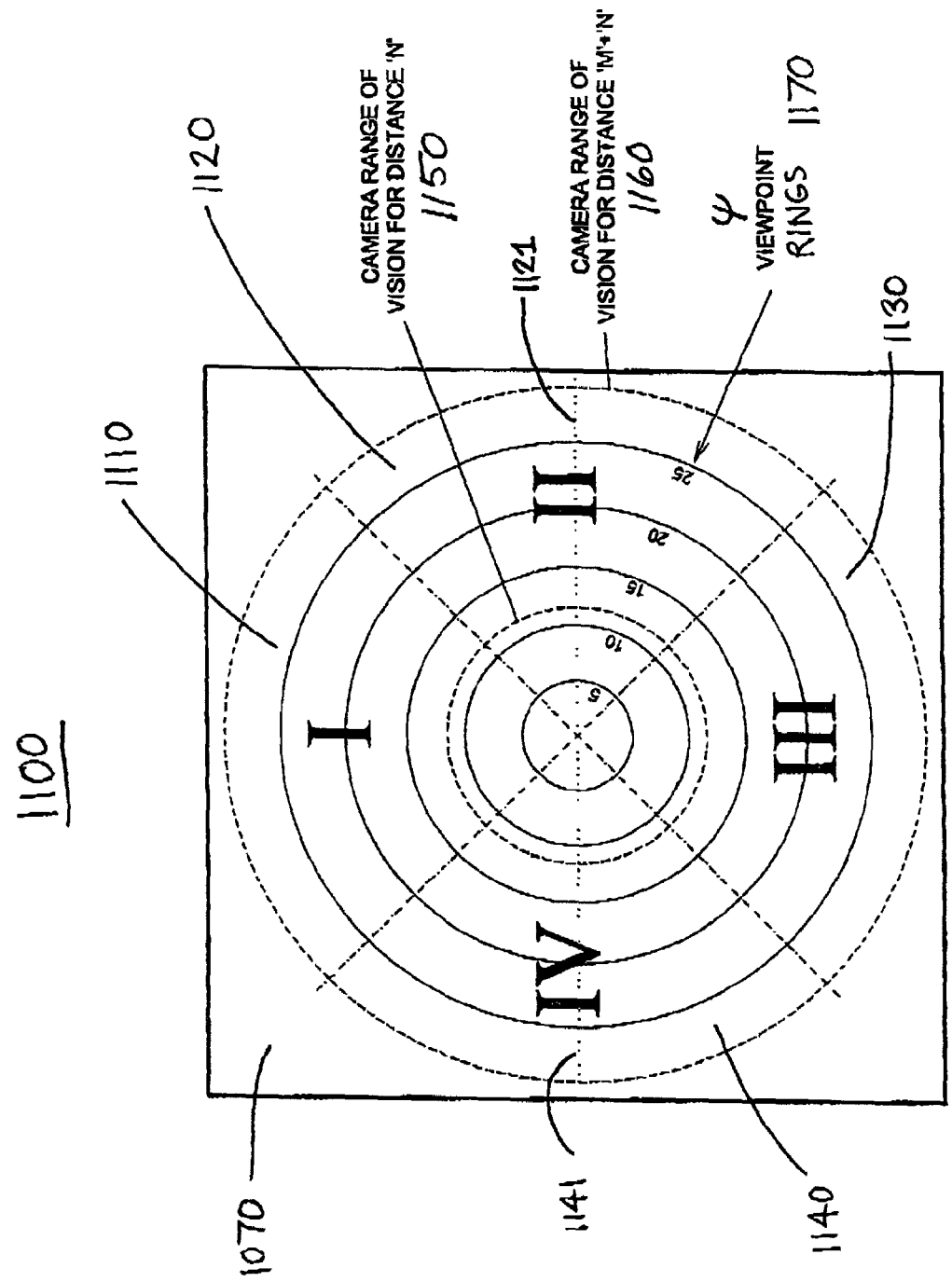
FIG. 11 is a diagram illustrating calibration plate quadrants in accordance with the preferred embodiment.

The calibration should be performed by the calibration plate 1070 at right angles to the direction of the camera 1030. Note that walls may be used as calibration plates. Also, the various calibration distances can be achieved by moving the group or data acquisition apparatus relative to the calibration plate. Referring to FIG. 11, were is shown a diagram illustrating calibration plate quadrants 1100 in accordance with the preferred embodiment. Perpendicularity can be verified by calculating the angles from all four quadrants 1110, 1120, 1130, 1140 around the calibration plate 1070. For perpendicularity, the angle $\phi/2$ should be equal, within a given tolerance, for all four quadrants 1110, 1120, 1130, 1140.

The camera viewpoint angles 1090 for each point within the camera fire can also be calibrated. Therefore, every "ring" 1170 within the calibrated frame has a unique camera viewpoint angle 1090. Referring to FIG. 16, there is shown a table 1600 listing camera viewpoint angle $\psi$ degrees 1610, distance centre-line to viewpoint 1620, and distance normalized (i.e. normalized such that P=1 unit at $\phi/2$=29 degrees) 1630, for the example case where $\phi/2$=29 degrees and L=1 m, in accordance with the preferred embodiment. Knowing these viewpoint angles 1090 is required for calculating the location of the laser reference point described below.

3D Data Coordinates: Laser Beams

From the above, the viewpoint angle portions of an acquired image can be determined. To determine 3D coordinates of points within the image, an additional reference point is required. A laser beam may provide his additional reference point.

Each laser beam should be conical-shaped so that the flier away it is from the data acquisition apparatus, the wider the beam is. Therefore, the laser should be of increased energy for objects located at greater distances. The angle of the cone should be chosen to match the desired resolution. That is, features located further away may not necessarily require the same resolution as objects located nearby. If high resolution is required for objects located further away, then a smaller cone should be used and/or the data acquisition apparatus should be moved closer to the target.

Figure 12:
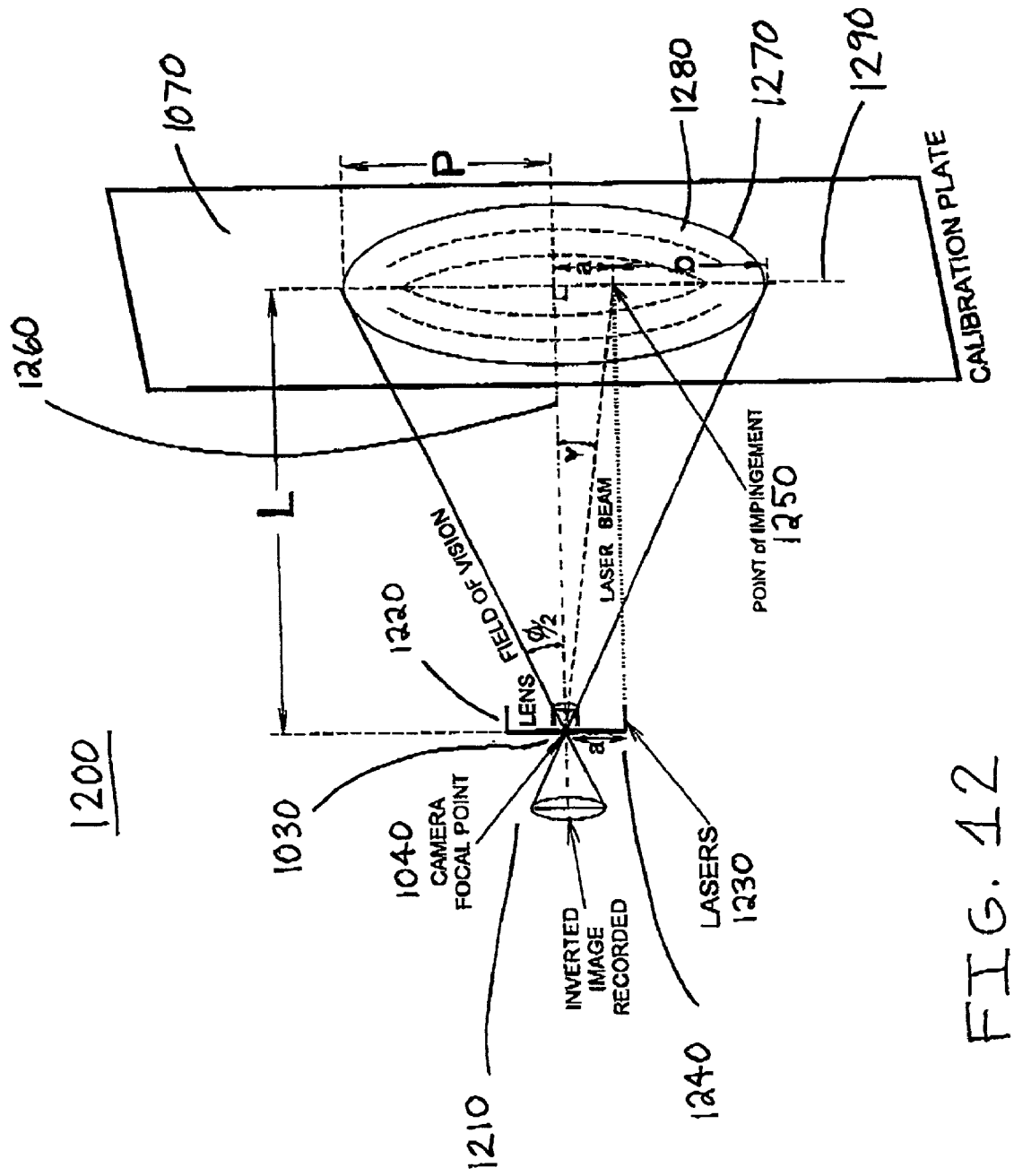
FIG. 12 is a schematic diagram illustrating a horizontal (non-rotated) laser/camera group in accordance with the preferred embodiment.

Referring to FIG. 12, there is shown a schematic diagram 1200 illustrating a horizontal laser/camera group 1210 in accordance with the preferred embodiment. In FIG. 12, the group 1210 consists of one camera 1030 and two lasers 1220, 1230. The method of the present invention involves the use of a laser 1230 located a fixed distance "a" from the camera 1030.

The laser 1230 points in a direction parallel to that of the camera 1030. In other words, and referring back to FIG. 1, $\theta y$=0 degrees. Note that distance a can be varied depending upon the site and system characteristics which will be discussed below.

Using the calibration plate 1070, calibrations can be made to ensure that the laser 1230 and camera 1030 directions are in the same plane and the focal point 1040 of the camera 1030 and hinge point 1240 of the laser 1230 are at the same y-coordinate (160 in FIG. 1). In FIG. 12, the point of impingement 1250 of the laser beam (i.e. the laser dot) is located in the vertical centre of quadrant II (1121 in FIG. 11). If the second laser 1220 was calibrated, its point of impingement would be located in the vertical centre of quadrant IV (1141 in FIG. 11). It is important for the camera to be properly located and directed with respect to the calibration plates, as discussed above, and that the centre of the photo is identifiable by pixel coordinates.

Note that as the calibration plate 1070 is moved toward or away from the camera 1030 in the direction of the camera 1030 and laser 1230 (i.e. along the y-axis in the coordinate system 160 of FIG. 1), the laser 1230 points at exactly the same spot on the calibration plate 1070, that is, a meters from the centre-line 1260. However, the camera 1030 "sees" the laser point 1250 moving towards the edge 1270 of the photograph 1280 as the calibration plate 1070 moves towards the laser/camera group 1210. If the direction of the laser is fixed at a different angle from the horizontal (i.e. if laser 1230 doesn't point in same direction as camera 1030), then the laser point of impingement 1250 would track at an angle from horizontal on the calibration plate 1070 as the distance between the plate 1070 and the apparatus changes. In the case where the laser direction is parallel to the camera direction, then the migration track of the laser beam from the vertical centre 1290 can be used to check and calibrate the system as described below. It can be shown that for every identified laser point of impingement, the 3D coordinates of the coinciding portion of the image has a unique solution. In general, each calibration plate 1070 is flat. While a convex plate may seem more appropriate given the nature of the camera lens and changing angle of incidence, this is not necessary because these effects are accounted for by the calibrations described in association with FIGS. 11 and 16.

3D Data Coordinates: Determination when the Lasers are Pointed in Same Direction as the Camera and are Located at a Distance "a" from the Camera Referring to FIGS. 10 and 12, the goal at this point is to determine the viewpoint angle $\psi$ from the calibration plate 1070. To accomplish this goal, two pixel counts are required.

The fist being the number of pixels in the photograph 1280 between the centre line of the photo 1260 and the position of the laser a. The second count required is the distance P expressed in number of pixels. The ratio of a (in pixel counts) over P (in pixel counts) is a number that can be matched to the distance normalized column 1630 of The table 1600 of FIG. 16.

The normalized column 1630 makes it possible to directly link laser positions with the image to camera viewpoint angles ψ.

The ratio a/P from the acquired image is located in The distance normalized column 1630 of FIG. 16. The corresponding camera viewpoint angle 1610 from the table 1600 is the required viewpoint angle ψ. Note again that table 1600 contained in FIG. 16 if for the example case where φ/2=29 degrees. The table 1600 can be recalculated depending on the true range of vision for the selected camera and lens.

Now that the camera viewpoint angle ψ for the laser impingement point 1250 is known, the distance L along the y-axis (160 in FIG. 1) between the camera focal point 1040 and the impingement point 1250 can be calculated as follows:

$$\tan(\psi) = a/L$$

therefore, $$L = a/\tan(\psi) \quad \text{(equation 3)}$$

where a and ψ are known and L can be expressed in meters.

The computer system records this value of L along with the corresponding x and z coordinates which correspond to the location of the camera focal point 1040 and the a-spacing in the XZ plane 160. In this way, 3D coordinates are established.

Figure 13:
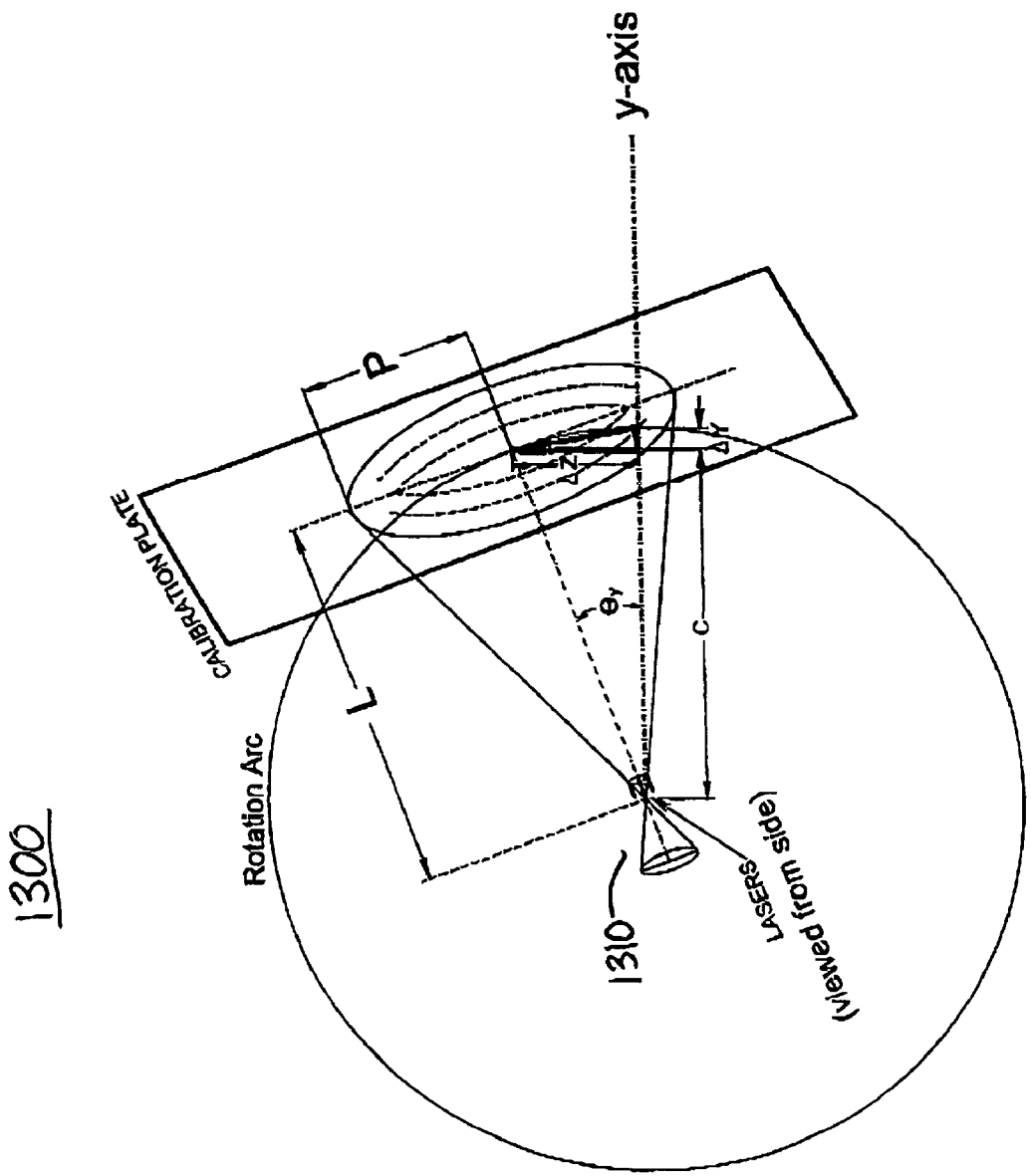
FIG. 13 is a schematic diagram illustrating a non-horizontal (rotated) laser/camera group in accordance with the preferred embodiment.

3D Data Coordinates: Determination when the Group Angle Varies Above or Below the Horizon in the YZ Plane As mentioned above, it is simpler and more accurate to rotate the entire laser/camera group 1210 than to use a rigid group with laser stripes. Referring to FIG. 13, there is shown a schematic diagram 1300 illustrating a rotated laser/camera group 1310 in accordance with the preferred embodiment The group rotation angle is given by θy. Once the point of impingement 1250 is known with respect to the rotated group 1310, it can be projected to the main coordinate system 160. The x-coordinate is unchanged because the group 1210 rotates about the x-axis 160. However, the y and z coordinates will change. To calculate the amount that the y and z coordinates need to shift, deltaY and deltaZ, so that they are referenced to the main coordinate system 160, the following calculations can be made:

$$\sin(\theta y) = \text{delta}Z/L$$

therefore, $$\text{delta}Z = L \sin(\theta y) \quad \text{(equation 4)}$$

and $$\tan(\theta y) = \text{delta}Z/C$$

therefore, $$C = (\text{delta}Z)/\tan(\theta y) \quad \text{(equation 5)}$$

Which means, $$\text{delta}Y = C - L \quad \text{(equation 6)}$$

By applying the shifts calculated in equation 4 and equation 6, it is possible to re-project the scanned image to the main coordinate system 160.

3D Data Coordinates: Determination for Movement of the Group Along the Y Axis (i.e. Movement of the Laser Across Photograph Frame)

Figure 14:
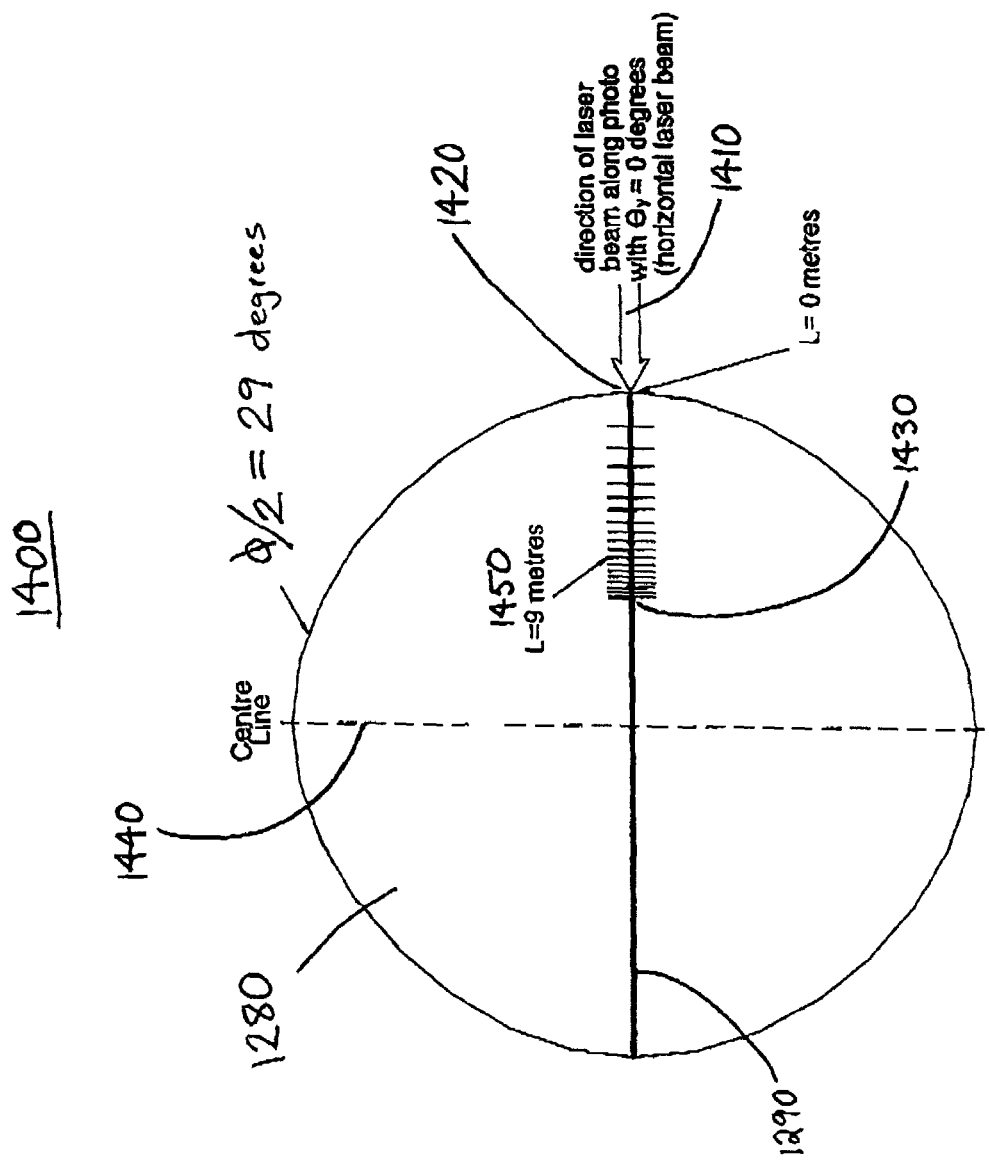
FIG. 14 is a diagram illustrating a calibration plate with movement of a laser across the photograph for equal changes in distance to the target in accordance with the preferred embodiment.
Figure 45:
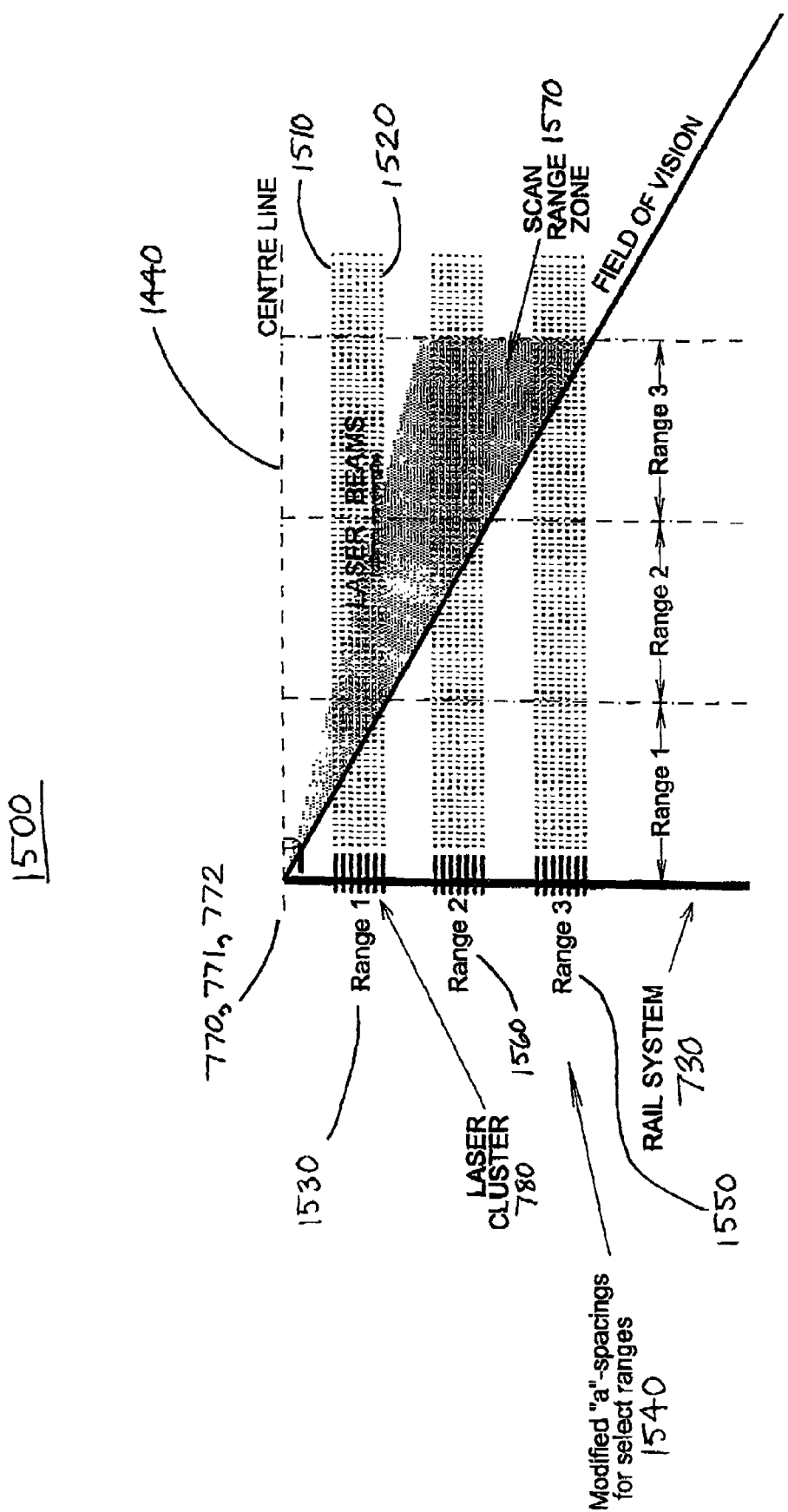
Figures 17A, 17B:
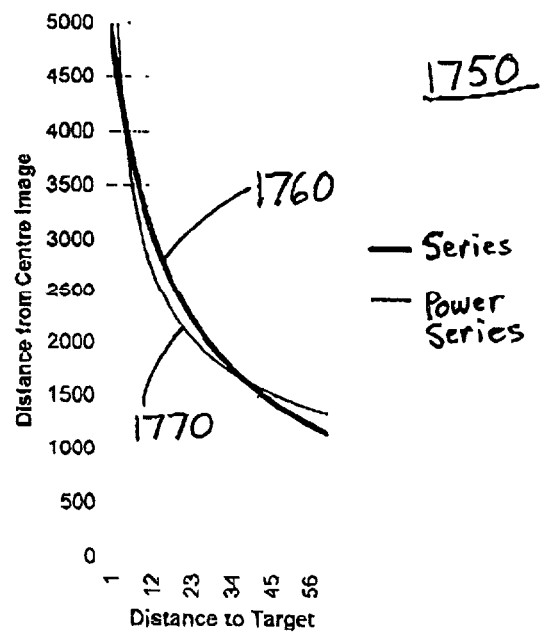
FIG. 17(a) is a table listing L, distance b, ratio a/(a+b), and number of pixels from the centre line (CL), for an example case, in accordance with the preferred embodiment.
FIG. 17(b) is a graph illustrating the relationship between the distance to a target and the distance from die centre of a photograph for an example case in accordance with the preferred embodiment; and, FIG. 18 is a flow chart illustrating a general method for collecting survey data including digital images and associated 3D coordinates for use in generating "real" image 3D computer models of subject matter of varying size in accordance with a preferred embodiment.

Referring to FIG. 14, there is shown a diagram illustrating a calibration plate 1400 with movement 1410 of a laser beam across the photograph 1280 for equal changes in distance to the target L in accordance with the preferred embodiment. In this case, the laser point of impingement 1250 moves across the photograph 1280 from the outside 1420 towards the centre 1430. For a parallel laser/camera group, the pat 1410 is along the center horizontal axis 1290. Referring to FIG. 17(*a*), there is shown a table 1700 listing L 1710, distance b 1720, ratio a/(a+b) 1730, and number of pixels from the centre line (CL) 1740, for the example case where φ/2=29 degrees, tan(φ/2)=0.5543, a=5 m, and the total pixel units from CL to edge=5000, in accordance with the preferred embodiment. This table 1700 contains exemplary calculated values of the predicted location of the point of impingement 1250 on a photograph 1280 for equal increments of increasing distance between the camera 1030 and the point of impingement 1250 Referring to FIGS. 12, 14, and 17, the corresponding calculations are as follows;

$$\tan(\phi/2) = (a+b)/L \quad \text{(equation 7)}$$

which is equivalent to $$b = L \tan(\phi/2) - a \quad \text{(equation 8)}$$

where L, φ/2, and a are known from established settings and calculations described above.

The ratio a/(a+b) 1710 is then calculated. Note that when b becomes very large, this ratio approaches zero. The ratio a/(a+b) 1710 can then be multiplied by the total number of pixels that span the photograph 1280 from the centre line 1440 to the edge of the useable image 1420 to yield column 1740 in FIG. 17(*a*). Referring to FIG. 17(*b*), there is shown a graph 1750 illustrating the relationship 1760 between the distance to a target 1710 and the distance from the centre of the photograph 1740 in accordance with the preferred embodiment. The "power series" curve 1770 is an exaggeration of the movement which makes it easier to define the distance to target 1710 at which a new a spacing should be selected. Hence, it is more difficult to differentiate different values of distance L when the distance a between The camera and laser becomes very small compared to the total distance photographed (a+b). For increasing values of L (i.e. increasing distance from the group 1210 to the point of impingement 1250), the rate of change for the number of pixels crossed 1410 by the beam decreases. This means that a relatively large shift in L will begin to have a relatively small shift across 1410 the photograph 1280 and therefore the calculated distance to the point of impingement 1250 will become more inaccurate. A solution to this problem is described below.

3D Data Coordinates: Laser Cluster Configuration

In the present invention, the distance between a specific laser cluster 780, 781 and the camera's centre-line 1440 is determined by the distance L to the target, as will be described As illustrated in FIGS. 12, 14, 15; 17(*a*), and 17(*b*), the a-spacing between the camera 1030 and lasers 1120, 1230 should increase for greater distances L to the target being scanned. Referring to FIG. 15, there is shown a diagram 1500 illustrating laser scanning ranges 1530, 1550, 1560 in accordance with the preferred embodiment. In general, laser scanning should be limited to regions 1570 that are greater than halfway from the centre 1440 of the photograph 1280. From FIGS. 17(*a*) and 17(*b*), this position if found by locating the value for the ratio a/(a+b)=0.5. The corresponding L value, for this example, is at 9 meters 1450 as shown in FIG. 14.

The goal at this point is to have laser cluster beam points of contact 1510, 1520 located between the range limit lines 1570 for the entire movement of the group and data acquisition apparatus along the grid in the x-direction (160 in FIG. 1). If a laser impinges on a surface outside the scanning range 1570, then it will be necessary to change the a-spacing to a new range 1540. The laser moves across the photograph at the greatest rate for changes in distance to target when it is nearer to the edge 1420 of the photograph as shown in FIGS. 14, 17(*a*), and 17(*b*), Therefore, greater accuracy in the calculation of 3D coordinates is made possible.

Each laser cluster 780, 781 may consist of many lasers. In this case, each laser can have a unique spectral signature or "colour" that can be recognized by the data acquisition computer system 900 or during post-processing of data. A method for recognizing the various spectral signatures of lasers is described in U.S. Pat. No. 5,753,931 to Borchers, et al. In the present invention, the spacing between lasers in a laser cluster 780, 781 is related to the resolution required by the survey plan. That is, if 1-cm detail is required, then the lasers should be spaced no more than 1 cm apart. If 1-meter accuracy is sufficient, for large structures located far from the apparatus (e.g. buildings), then the lasers would be spaced less than 1 m apart on a large rail system 710 as shown in FIG. 7. While survey resolution is related to the spacing of individual lasers within a laser cluster 780, 781, it is also related to the size of the incremental "steps" that each laser/camera subgroup is shifted or rotated along the rail 730 for each photograph and to the size of the incremental steps of the entire data acquisition apparatus 710, 810 as it moves along the survey grid 410.

In FIG. 15, Range 1 1530 uses a small a-spacing 1540, whereas Range 3 1550, for further targets, has a larger a-spacing 1540. The data acquisition computer system 900 can automatically adjust the a-spacing if the impingement area is beyond a predetermined range 1570, as described above. If high accuracy is required, more range-windows 1530, 1550, 1560 can be allowed for at the cost of slowing the speed of the overall survey.

To increase the speed at which a survey may be conducted, of course, repetitive movements of the group along the rail, movement of the data acquisition apparatus along the grid, etc., can be automated.

Conducing the Survey. Once the survey plan has been established and the data acquisition system has been configured, the survey may proceed and data may be acquired. According to the present invention, data acquisition includes the following elements:

Establishing the Survey Grid
Positioning the Data Acquisition Apparatus
Acquiring and Storing Data Establishing the Survey Grid. This is an important element in conducting the survey as an accurate, well laid out grid will maintain the overall quality of the survey data acquired.

It also allows the survey to be carried out in a structured and efficient manner. A poorly laid out grid will degrade the integrity of the data, regardless of how well the remainder of the survey is performed.

Referring to FIG. 4, the survey grid 410 need only be laid out on the floor or ground for the control of x and y directions 160. The z-direction 160 is controlled by the telescopic adjustment means 760 associated with each post 740, 741 of the data acquisition apparatus 710, 810. Note also that the "lines" defining each cell 420 need not be drawn, rather, grid vertices 430 may be marked with "dots" or pre-programmed using GPS navigation as mentioned above.

A grid reference origin must be selected. For example, in FIG. 4, the origin 440 is located in the corner of the room. The reference system 160 may be used to define positive x, y, and z directions.

The survey grid 410 should be established in all accessible locations in accordance with the resolution and detail of data required by the survey plan, A smaller data acquisition apparatus 710, 810 may be required to gather data from behind the table 450 shown in FIG. 4, for example, if information in this area is deemed important. Note that the survey grid 410 was not laid-out on top of the table 450 in FIG. 4. The reason being that pre-measured reference guides can be extended to known reference points where needed.

Sub-grids can also be established in areas that require higher detail scanning. For example, if the data acquisition apparatus needs to be located on top of the table 450 so that greater detail can be obtained for the flower pot 460, then the data acquisition apparatus can be referenced to the survey grid 410 laid out on the floor using devices such as plumb-bobs and measuring tapes. Data acquisition system software can allow for the input of such parameters so that the acquired data can be referenced to the main survey grid 410.

For small-scale surveys, the survey grid cell density may be as high as every few centimeters. For medium scale surveys, the density could increase to half-meter intervals. For large-scale surveys, the grid could be established on parallel base lines and tie lines spaced, say, 40 meters apart, with reference points marked along the base and tie-lines at 2-meter intervals. Fluorescent orange spray paint or chalk can be used to mark the grid in such circumstances.

Note that the data acquisition apparatus need not traverse the entire survey grid 410. Rather, the goal is to acquire data that can be used to display the various images acquired with 3D coordinates. The detailed grid layout gives the operator greater flexibility for deciding, on the fly, where greater detail is required, and areas where the data acquisition apparatus need not traverse. For example, wide-open rooms need only be surveyed along an inside perimeter.

Positioning the Data Acquisition Apparatus

The data acquisition apparatus 710, 810 can begin scanning from any location on the survey grid 410 as long as the x, y and z-coordinates are known and recorded for its every position. Otherwise, it will not be possible to reference the 3D position of the scanned surface to the main survey grid 410.

The scanning process involves two classes of movement, namely, "primary movement" and "secondary movement". A primary movement involves the movement of the entire data acquisition apparatus 710, 810 over the main survey grid 410 or sub-grids. A secondary movement may include of the following four types of movement:

1) Type I: Changing 790, 791 the a-spacing for each laser/camera subgroup;
2) Type II: Changing 790, 791 separation between the individual lasers for each laser cluster;
3) Type III: Vertical shining 760, 761 of the laser/camera group and rail along the posts in the z-direction; and,
4) Type IV: Horizontal shifting 750, 751 of the laser/camera subgroups along the rail.

In general, primary movements are for setup and data acquisition apparatus placement at the site. Secondary movements position the individual components of the data acquisition apparatus for detailed data collection.

To begin the survey, the data acquisition apparatus is setup and positioned at a grid reference point (e.g. (x,y,z)=(5 m, 6 m, 0 m) in the survey grid coordinate system 160). This is a primary movement. Once the apparatus is positioned, data can be acquired. Type I and Type II positions are set initially. Once these are set, either the Type III or Type IV movements can commence. Changes in Type I and Type II settings can be made as needed during scanning. The data acquisition computer system 900 keeps track of these settings and parameters.

Collecting and Storing Data

As mentioned with reference to FIGS. 9(*a*) and 9(*b*), the data acquisition computer system 900 can control the mechanical movements of the data acquisition apparatus 710, 810 as well as the collection and storage of data. This is achieved with parallel processing software, which can be written in Linux. Each computer node of the data acquisition computer system is synchronized and all data collected is stored with corresponding time stamps. Additional cross-referencing data can also be recorded for each parameter to allow for the more reliable post-processing of data. For example, semi-static settings associated with Type I and Type II movements can be recorded with various data as required.

As data is collected, it can initially be held in RAM/cache memory which saves time. From there, the data can be stored on a more permanent media (e.g. hard disk, CD ROM, etc.). Referring to FIG. 9(*b*), data is stored in the "a-series" nodes (i.e. 1*a*, 2*a*, 3*a*, 4*a*, 5*a*, 6*a*, 7*a*, and 8*a*) and can be backed-up to other "a-series" node or to a backup node 960. For example, a copy of data stored in node 8*a* can be made and transferred to node 7*a* for backup, and vice-versa. Data backup is important as loss of data can involve substantial cost.

Post-Processing the Data. After the survey is finished, data is transferred from the "a-series" nodes of the data acquisition computer system 900 to an office-based post-processing computer system. This post-processing computer system cam be in the form of a network cluster designed as a series of layered nodes, controlled by a master node, similar to that illustrated in FIGS. 9(*a*) and 9(*b*) for the data acquisition computer system 900, Again, each node can have a specific or redundant function. The goal of data post-processing is to compile all data for each sub-system (e.g., a-spacings, main grid coordinates, sub-grid coordinates, data acquisition apparatus height, photographic images, laser frequencies, etc.). Compiled data can then be stored in a database that allows for rapid access and correlation For example, relational databases can be configured so that specific data parameters can be accessed by the post-processing computer system rapidly. In addition, different nodes can store different parameters all of which can be cross-referenced.

During post-processing, each stored digitized photograph or image must be "re-scanned" by the computer. Re-scanning involves searching for the laser point of impingement and determining the 3D coordinates for each portion of the image. Methods of re-scanning are described in U.S. Pat. No. 5,753,931 to Borchers, et al.; U.S. Pat. No. 5,513,276 to Theodoracatos; and, U.S. Pat. No. 5,675,407 to Geng.

In addition, 3D calculations are computed, as described above, and a matrix of solutions can be created that include the x,y,z position and pixel value for the image (e.g. 24 bit Red, Green, Blue sub-matrix). These matrices of solutions can be stored in various formats so that access by other applications is rapid. For example, the matrices can be broken down into low resolution blocks, medium resolution blocks, and high-resolution sectors.

Moving-average pixel values can also be incorporated into the database. For example, images that are located at large distances from the observer can be represented by the average value (e.g. RGB) of many pixels within a pixel-grouping radius. The greater the number of computer nodes that can be accessed in parallel by the post-processing computer system, the greater the ability to store the data in various formats.

The storage in the post-processing computer system of 3D positioning and image data in various databases facilitates multiple applications each of which may require data of a certain kinds or in certain formats. In addition, because it is likely that more data will be acquired than may be necessary for a given application, the post-processing computer system may include means for data screening and filtering. For example, data acquired from the survey of a baseball stadium can be divided into a number of 3D sectors each having varying levels of resolution and detail. These sectors can be analyzed, processed, and stored based on data requirements. A high detail sector can have more data stored whereas a low detail or low priority sector could contain more averaged data.

Applying the Data

The data acquired can be converted to the format required by a client application. Data compression techniques may be applied to the data to allow easier data transfer across various media and storage devices. Applications of the data acquired by the method, system, and apparatus of The present invention may include the following:

Small or large scale scene investigations independent of the time and place of data acquisition.

Roaming an area from a remote location (e.g. over a computer network).

Computer graphics and displays using "real" images manipulated in 3D.

Modification of moving picture scenes independent of the the and place of data acquisition.

Small and large object digitization.

Dangerous site exploration including outer space, nuclear reactors, and marine applications independent of the time and place of data acquisition.

Simulators, including flight simulators, made more life-like with "real" images.

Full scans of movable objects, including people, for computer manipulation and animation using "real" images.

Model studies and computer simulation testing based on the scanned data for real structures including airplanes, automobiles, ships, buildings, bridges, etc.

To reiterate and expand, the method, system, and apparatus of the present invention includes the following unique features and advantages:

Flexibility for large-scale or small-scale surveys of objects or areas.

A systematic approach, from defining the goal of a survey, to making the resulting data available for a wide range of applications.

Acquisition of data efficiently and accurately without numerous calibrations and complicated calculations.

Identification of parameters that are important for configuring system (e.g. scale, resolution, accuracy, mode, etc.).

Provision for transporting and mounting component assemblies (e.g. posts, rails, beams, etc.)

A computer architecture for acquiring, cross-referencing, and processing extremely large data sets from multiple sources.

A calibration method responsive to unique camera lens parameters (e.g. focal lengths distortion, etc.).

Responsive to accuracy reduction due to greater distances between target object and scanning apparatus (i.e. increased camera-laser separations) by defining "scanning ranges".

Simple to implement, provides an entire practical process, and is not limited to "object" scanning for manufacturing and quality control.

Takes advantage of parallel computing power to handle multiple lasers and camera groups.

Use of a grid pattern for scanning.

Capability of using range finders and similar devices to assist in defining camera-laser ranges.

Accommodation of many survey beam angles to the camera direction by movement and rotation of the entire scanning assembly. This greatly simplifies calibration requirements and increases flexibility.

Complete process from start to finish for any scale, resolution, and accuracy.

Parallel computer cluster for rapid and simple data acquisition and processing.

Laser/camera "groups" and mounting/transport systems (e.g. trucks, beams, etc.).

Simple and accurate camera calibration procedure.

Determination of optimal camera-laser separations due to increased distance to targets.

Although the invention has been described with reference to certain specific embodiments, various modifications thereof will be apparent to those skilled in the art without departing from the spirit and scope of the invention as outlined in the claims appended hereto.

The invention claimed is:

1. A data acquisition apparatus for scanning a surface to record digital images thereof and to record data for determining three-dimensional coordinates thereof, said apparatus comprising:
at least one camera for recording said digital images of said surface, said camera having an optical axis;
at least two lasers for marking points in said digital images for determining said three dimensional coordinates of said surface, said lasers having optical axes, said optical axes of said camera and said lasers being essentially parallel;
an essentially horizontal rail for mounting said camera and said lasers, said camera being mounted between said lasers, and said rail having means for horizontally shifting said camera and said lasers along said rail, the positions of said lasers being adjustable relative to the camera, via said means for horizontally shifting said camera and said lasers, depending on the scale of the surface to be recorded;
at least one essentially vertical post attached to said rail by means for rotating and horizontally shifting said rail, said post having means for vertically shifting said rail;
at least one movable platform for mounting said posts and for positioning said camera and said lasers proximate to said surface; and,
data acquisition equipment for adjusting said platforms, said posts, said rail, said camera, and said lasers; for recording position data for said platforms, said posts, said rail, said camera, and said lasers; and, for recording said digital images.

2. The apparatus of claim 1 wherein said surface is selected from the group comprising an object, an area, a room, a building, an indoor area, and an outdoor area.

3. The apparatus of claim 1 wherein said surface is variable in size.

4. The apparatus of claim 1 wherein said data acquisition equipment includes a data acquisition computer system in communication with said data acquisition apparatus, said data acquisition computer system comprising:
means for adjusting said data acquisition apparatus in accordance with user instructions;
means for receiving said position data and said digital images from said data acquisition apparatus;
means for determining three-dimensional coordinates of said surface from said position data and said digital images;
means for associating said digital images with said three-dimensional coordinates to produce said three-dimensional data model;
memory for storing said position data, said digital images, said three-dimensional coordinates, and said three-dimensional data model;
a display for presenting said three-dimensional data model to said user; and,
an input device for accepting user instructions from said user for adjusting said data acquisition apparatus.

5. The apparatus of claim 4 further comprising a post-processing computer system for formatting said three-dimensional data model for export to an external application.

6. The apparatus of claim 4 wherein said data acquisition computer system includes a master node controlling a network of parallel computer slave nodes.

7. The apparatus of claim 6 wherein said network of parallel computer slave nodes has a configuration selected from the group comprising a cube, a hyper cube, a mesh, and a layered web.

8. The apparatus of claim 4 wherein said user instructions include predetermined data parameters for said three-dimensional data model.

9. The apparatus of claim 8 wherein said predetermined data parameters are selected from the group comprising area mode, object mode, size of area, size of object, resolution, accuracy, and detail.

10. A data acquisition system for generating a three-dimensional data model of a surface, said system comprising:
a data acquisition apparatus for scanning said surface to record digital images thereof and to record data for detennining three-dimensional coordinates thereof, said data acquisition apparatus comprising:
at least one camera for recording said digital images of said surface, said camera having an optical axis; at least two lasers for marking points in
said digital images for determining said three-dimensional coordinates of said surface, said lasers having optical axes, said optical axes of said camera and said lasers being essentially parallel;
an essentially horizontal rail for mounting said camera and said lasers, said camera being mounted between said lasers, and said rail having means for horizontally shifting said camera and said lasers along said rail, the positions of said lasers being adjustable relative to the camera, via said means for horizontally shifting said camera and said lasers, depending on the scale of the surface to be recorded;

at least one essentially vertical post attached to said rail by means for rotating and horizontally shifting said rail, said post having means for verticaily shifting said rail;

at least one moveable platform for mounting said posts and for positioning said camera and said lasers proximate to said surface; and, data acquisition equipment for adjusting said platforms, said posts, said rail, said camera, and said lasers; for recording position data for said platforms, said posts, said rail, said camera, and said lasers; and, for recording said digital images; and, a data acquisition computer system in communication with said data acquisition apparatus, said data acquisition computer system comprising:

means for adjusting said data acquisition apparatus in accordance with user instructions;

means for receiving said position data and said digital images from said data acquisition apparatus;

means for determining three-dimensional coordinates of said surface from said position data and said digital images;

means for associating said digital images with said three-dimensional coordinates to produce said three-dimensional data model;

memory for storing said position data, said digital images, said three-dimensional coordinates, and said three-dimensional data model;

a display for presenting said three-dimensional data model to said user; and, an input device for accepting user instructions from said user for adjusting said data acquisition apparatus.

11. The data acquisition system of claim 10 and further comprising a post-processing computer system for formatting said three-dimensional data model for export to an external application.

12. The data acquisition system of claim 10 wherein said data acquisition computer system includes a master node controlling a network of parallel computer slave nodes.

13. The data acquisition system of claim 12 wherein said network of parallel computer slave nodes has a configuration selected from the group comprising a cube, a hyper-cube, a mesh, and a layered web.

14. The data acquisition system of claim 10 wherein said user instructions include predetermined data parameters for said three-dimensional data model.

15. The data acquisition system of claim 14 wherein said predetermined data parameters are selected from the group comprising area mode, object mode, size of area, size of object, resolution, accuracy, and detail.

* * * * *